United States Patent
Takagimi et al.

(10) Patent No.: US 7,226,543 B2
(45) Date of Patent: Jun. 5, 2007

(54) RARE EARTH METAL OXYSULFIDE REGENERATIVE MATERIAL AND REGENERATOR

(75) Inventors: Yanagitani Takagimi, Kagawa (JP); Nozawa Hoshiteru, Marugame (JP); Kagawa Katsunori, Marugame (JP)

(73) Assignee: Konoshima Chemical Co., Ltd., Chuo-ku, Osaka-shi, Osaka (JP)

( * ) Notice: Subject to any disclaimer, the term of this patent is extended or adjusted under 35 U.S.C. 154(b) by 432 days.

(21) Appl. No.: 10/344,917

(22) PCT Filed: Jun. 13, 2002

(86) PCT No.: PCT/JP02/05933

§ 371 (c)(1), (2), (4) Date: Jul. 29, 2003

(87) PCT Pub. No.: WO02/103259

PCT Pub. Date: Dec. 27, 2002

(65) Prior Publication Data

US 2004/0013593 A1    Jan. 22, 2004

(30) Foreign Application Priority Data

Jun. 18, 2001 (JP) ............................ 2001-183895
Jan. 18, 2002 (JP) ............................ 2002-010196

(51) Int. Cl.
*C09K 5/00* (2006.01)
*F28F 99/00* (2006.01)

(52) U.S. Cl. ............................ 252/1; 252/67; 252/71; 62/6; 62/909; 165/4

(58) Field of Classification Search ............ 423/263, 423/511, 512.1, 518; 165/4; 62/909, 6; 252/1, 67, 71

See application file for complete search history.

(56) References Cited

U.S. PATENT DOCUMENTS

| | | | |
|---|---|---|---|
| 4,408,463 A | 10/1983 | Barclay | |
| 5,449,416 A | 9/1995 | Arai et al. | |
| 5,795,554 A * | 8/1998 | Fang et al. | 423/263 |
| 6,296,824 B1 * | 10/2001 | Leppert | 423/263 |
| 6,419,736 B1 * | 7/2002 | Pfaff et al. | 106/417 |

FOREIGN PATENT DOCUMENTS

| | | | |
|---|---|---|---|
| EP | 0 690 116 A1 * | 1/1996 | |
| JP | 60-73267 A * | 4/1985 | |
| JP | 4-55316 A * | 2/1992 | |

* cited by examiner

*Primary Examiner*—Timothy C. Vanoy
(74) *Attorney, Agent, or Firm*—The Webb Law Firm

(57) ABSTRACT

A rare earth metal oxysulfide represented by a general formula $R_2O_2S$ (R denotes one kind or two or more kinds of rare earth elements to be selected from a group of La, Ce, Pr, Nd, Sm, Eu, Gd, Tb, Dy, Ho, Er, Tm, Yb and Lu, as wells as Y) is formed into spherical granules. The mean particle size of the granules is 0.05–1 mm and their relative density is 96% or over. The granules are used as a regenerative material at the liquid helium temperature.

15 Claims, 7 Drawing Sheets

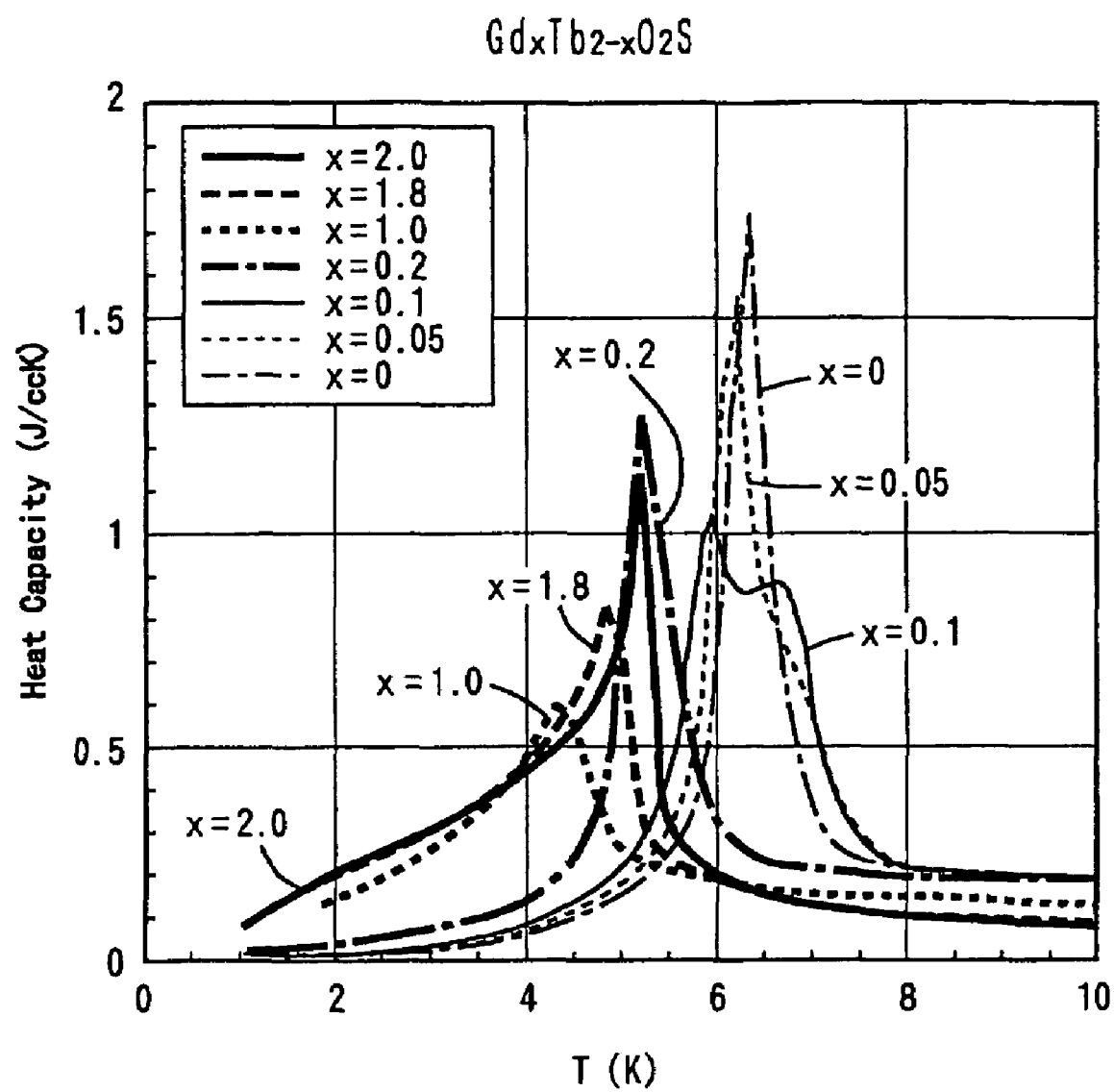

RARE EARTH METAL OXYSULFIDE REGENERATIVE MATERIAL AND REGENERATOR

CROSS-REFERENCE TO RELATED APPLICATIONS

The present application is the national phase of PCT Application No. PCT/JP02/05933, filed Jun. 13, 2002, now Publication No. WO 02/103259, published Dec. 27, 2002, which corresponds to Japanese Application No. 2002-10196, filed Jan. 18, 2002 and Japanese Application No. 2001-183895, filed Jun. 18, 2001.

FIELD OF THE INVENTION

The present invention relates to a rare earth metal oxysulfide regenerative material and a regenerator using the material. In particular, the invention relates to a regenerative material and a regenerator both having a large heat capacity at a temperature in the neighborhood of 4.2 K required in the liquefaction of He gas, and generating no abrasion dust during a refrigerator operation.

PRIOR ART

Liquid helium is needed to cool superconducting magnets, sensors, etc., and an enormous amount of compression work is needed to liquefy He gas, thus a large-sized refrigerator is needed for this purpose. It, however, is difficult to use large-sized refrigerators for small-sized facilities using superconductive phenomena such as linear motor cars or MRI (magnetic resonance induction analyzer). Hence a small-sized high-performance refrigerator that can generate the liquid helium temperature (4.2 K) is indispensable.

The cooling efficiency, the lowest achieved temperature, and the like of a small-sized refrigerator depend on regenerative materials, the fillers of the regenerator. Such regenerative materials are required to have a sufficiently large heat capacity and a high heat exchange efficiency for helium or refrigerant passed through the regenerator. The conventional metallic regenerative materials such as Pb show a sharp drop in the heat capacity at 10 K and under. Accordingly, some regenerative materials comprising rare earth intermetallic compounds such as $HoCu_2$ or ErNi have been developed (JP2609747, U.S. Pat. No. 5,449,416). They have large heat capacities at 20 K–7 K as shown in FIG. 1, but their heat capacities are small at temperatures under 7 K. Moreover, regenerative materials are required to have a good durability against heat impacts and vibrations during a refrigerator operation.

SUMMARY OF THE INVENTION

The primary object of the present invention is to provide a regenerative material having a large heat capacity in the neighborhood of the liquid helium temperature and a high durability against heat impacts and vibrations, and to provide a regenerator using the regenerative material.

The secondary object of the invention is to provide a regenerative material and a regenerator suited to refrigerating down to temperatures of 4 K to 7 K.

Another secondary object of the invention is to provide a regenerative material and a regenerator suited to refrigerating down to temperatures of 2 K to 4 K.

Another secondary object of the invention is to improve the durability of the regenerative material for the operation of regenerators.

Regenerative Material

The regenerative material of the present invention comprises a rare earth metal oxysulfide represented by a general formula $R_2O_2S$® denote one kind or two or more kinds of rare earth elements to be selected from a group of La, Ce, Pr, Nd, Sm, Eu, Gd, Tb, Dy, Ho, Er, Tm, Yb and Lu, as wells as Y). Preferably, the rare earth element is at least one member of a group comprising Gd, Tb, Dy, Ho and Er, and more preferably, the rare earth element is Gd or Tb.

For example, when the rare earth metal oxysulfide is $Gd_{2-x}Tb_xO_2S$ (x=0.2–2), the temperature at which a peak of its specific heat is presented can be varied in a range of the neighborhood of 6 K to the neighborhood of 4 K. Especially, when the value of x is 1.6–2, preferably, 1.8–2, and more preferably, 1.9–2, a temperature at which a peak of its specific heat is presented is a rather higher than a temperature at which a peak of its specific heat is presented on $Gd_2O_2S$. When this regenerative material is combined with a regenerative material including Gd as rare earth elements as the main component, large specific heats can be presented for a broad range of 4 K to 7 K, and this combination of regenerative materials is particularly suited for a cooling down to the neighborhood of the liquid helium temperature.

As oxysulfides of Ho or Dy have their specific heat peaks on the lower temperature side of those of oxysulfides of Gd, the former are particularly suited for a refrigerating down to 2 K–4 K. And, for example, when a regenerative material including Gd as the main component of its rare earth elements is arranged on the higher temperature side, and a regenerative material comprising an oxysulfide of Ho or Dy is arranged on the lower temperature side thereof, refrigerating down to 4 K can be done by the regenerative material including Gd as the main component of the rare earth elements, and refrigerating at 4 K and under can be done by the regenerative material including Ho or Dy as the main component of the rare earth elements; thus the refrigerating down to 4 K and under can be done efficiently.

Preferably, the rare earth metal oxysulfides are used in the form of granules, and more preferably, the mean particle size of the granules is 0.05 mm–1 mm. The mean aspect ratio of the granules is preferably 3 or under, and the relative density of the granules is preferably 96% or over. The rare earth metal oxysulfide in the granules has preferably a mean grain size of 100 μm or under, the surface roughness based on the maximum height Rmax of the granules is preferably 10 m or under, and an excess sulfur content in the granules is preferably 10000 wtppm or under. Preferably, a volume specific heat of the granules has the maximum at 2 K–7 K.

Addition of Toughenings

Preferably, an additive comprising an oxide, a carbide or a nitride of at least one member of a group comprising alkaline-earth metals, transition metals, and elements of 3b and 4b groups of the periodic law including B and excluding C is added to the rare earth metal oxysulfide by 0.05–30 wt %. The amount of addition is expressed in such a manner that one part by weight of the additive in 100 parts by weight of the regenerative material is 1 wt %.

Preferably, the additive is at least one member of a group comprising $Al_2O_3$, $ZrO_2$, mullite, $Si_3N_4$, Sialon, TiN, AlN, BN, SiC and TiC, and more preferably, the additive is at least one member of a group comprising $ZrO_2$, mullite, $Si_3N_4$, Sialon, TiN, AlN, BN, SiC, and TiC. Mullite is a compound with $xAl_2O_3 \cdot ySiO_2$ composition (x:y=3:2–2:1), and Sialon is a non-stoichiometric compound of Si, Al, O, and N.

Preferably, the additive is an oxide of at least one alkaline-earth metal element of a group comprising Mg, Ca, Sr, and Ba.

Preferably, the additive is an oxide of at least one transition metal element of a group comprising elements of which atomic numbers are 22 (Ti)–31 (Ga) and 72 (Hf).

Preferably, $R_2O_2S$ phase as the main phase and a second phase containing the additive and differing from the main phase are formed in the ceramics microstructures of the rare earth metal oxysulfide regenerative material.

Regenerator

A rare earth metal oxysulfide regenerative material is packed in an appropriate cylinder or the like to make a regenerator. The rare earth metal oxysulfides exhibit good specific heats at 7 K or under, and when a regenerative material including HoCu2 as a main component is arranged on the higher temperature side of a rare earth metal oxysulfide regenerative material, refrigerating down to 7 K can be done by $HoCu_2$ and refrigerating at 7 K and under can be done by the rare earth metal oxysulfide regenerative material; thus refrigerating down to 7 K and under can be done efficiently.

Oxysulfide regenerative materials including Gd as the main component of rare earth elements thereof have their specific heat peaks at 5 K–4 K, and their specific heats at 7 K–5 K are not sufficient. Hence, preferably, an oxysulfide regenerative material including Tb as the main component of rare earth elements thereof is arranged on the higher temperature side of an oxysulfide regenerative material including Gd as the main component. As for refrigerating down to 4 K and under, an oxysulfide regenerative material including Gd as the main component of rare earth elements thereof is arranged, and an oxysulfide regenerative material including Ho or Dy as the main component of rare earth elements is arranged on the lower tempera side of the former. Refrigerating down to 2 K–4 K is effective, for example, for enhancement of the sensitivity of an X-ray detector with cooling on the analyze of semiconductors with transmission X-rays or the like, and for the preliminary stage cooling of an adiabatic demagnetization refrigerator.

Now, the representation of rare earth elements in rare earth metal oxysulfides will be explained. An oxysulfide regenerative material of Gd or one with Gd being its main component means that 50 atom % or over of its metallic components is Gd. For example, as shown in Table 1, $Gd_1Tb_1O_2S$ has a specific heat peak on the lower temperature side of that of $Gd_2O_2S$ and is similar to $Gd_2O_2S$ rather than to $Tb_2O_2S$. As for Tb, Dy, Ho, etc., an oxysulfide of any of these elements or an oxysulfide with any of these elements as the main component indicates that 80 atom % or over of its metallic components is one of these elements. For example, even if the metallic components of an oxysulfide is substituted with a different element by 10 atom %, the specific heat characteristics of the resulting oxysulfide will not differ much from those of the original one.

Refrigeration Characteristics

Rare earth metal oxysulfide regenerative materials undergo magnetic phase transition in the neighborhood of 7 K–2K, and they have heat capacities as large as 2 to 5 times those of the conventional regenerative materials such as $HoCu_2$ or ErNi. Accordingly, rare earth metal oxysulfide regenerative materials show high refrigeration performances in a cryogenic environment in the neighborhood of 4.2 K and their lowest achieved temperatures are lower than those of the conventional regenerative materials. Thus with rare earth metal oxysulfide regenerative materials, it is easy to obtain small-sized regenerators having a high refrigerating efficiency. The regenerative material according to the present invention can be used for superconducting magnets, refrigerators for cooling MRI, etc. Moreover, by selecting the kinds of rare earth elements and using a plurality of rare earth elements, a desired magnetic phase transition temperature can be obtained, and the range of the specific heat peak in the neighborhood of the magnetic phase transition temperature can be extended. With the use of spherical rare earth metal oxysulfide regenerative material granules, the transfer resistance of the refrigerant can be lowered while raising the packing density of the regenerative material. Furthermore, by reducing the surface roughness of the granules, generation of dust can be prevented, and the useful life of the regenerative material can be extended.

Regenerators are required to have a continuous range of specific heat from the higher temperature side to the lower temperature side and a broad range of distribution of specific heat in the neighborhood of the target refrigeration temperature. The former is a characteristic that is required for efficiently refrigerating down to the target temperature, and the latter is a characteristic for allowing the selection of a target temperature from a wider range. As rare earth metal oxysulfide regenerative materials have small specific heats at 7 K and over, it is desirable to arrange a regenerative material such as $HoCu_2$ on the higher temperature side of a rare earth metal oxysulfide regenerative material. As a single rare earth metal oxysulfide regenerative material can provide only a narrow range of specific heat distribution, it is desirable to provide, in layers, a rare earth metal oxysulfide regenerative material for lower temperatures and one for higher temperatures so that these materials as a whole can provide a continuous range of specific heat. In particular, oxysulfides including Gd as the main component have insufficient specific heats at 6 K–7 K, it is desirable to provide an oxysulfide including Tb as the main component on the higher temperature side of the former. As for refrigerating down to 4 K and under, it is desirable to provide an oxysulfide including Ho or Dy as the main component on the lower temperature side of an oxysulfide including Gd as the main component.

Preparation of Rare Earth Metal Oxysulfide Regenerative Material

A rare earth metal oxysulfide is generated, for example, by placing powder of a rare earth oxide in a reaction tube, and heating the tube while passing a gas containing sulfur atoms of oxidation number –2, such as $H_2S$ or CH3SH through the tube. Preferably, the reaction temperature is 500–800° C., and more preferably, 600–700C. When the temperature is under 500° C., it takes a long time to complete the reaction When the temperature exceeds 800° C., the reaction will start to generate a sulfide. Preferably, the reaction time is 1–9 hours, and more preferably, 1–3 hours.

It is desirable to granulate the regenerative material. This is to make the regenerative material more resistant to the compression at the time of packing the material into a regenerator and to the heat impacts and vibrations during its use and prevent generation of dust. In particular, it is desirable to make the granules more spherical. Preferably, the mean ratio of the largest dimension to the smallest dimension of the granules (the mean aspect ratio) is 3 or under, and more preferably, 2 or under, and much more preferably, in the neighborhood of 1, in other words, nearly true spheres. As rare earth metal oxysulfides are brittler than rare earth intermetallic compounds, when the mean aspect ratio exceeds 3, granules of a rare earth metal oxysulfide tend to break up. Moreover, when the mean aspect ratio exceeds 3, it will be difficult to uniformly pack the granules into a regenerator.

Preferably, the mean particle size of the granules is 0.05–1 mm. When the mean particle size is less than 0.05 mm, the packing density will get higher, and the He refrigerant can not pass sufficiently through the regenerator and the heat exchange efficiency will deteriorate. On the other hand, when the mean particle size exceeds 1 mm, the contact area with the He refrigerant will get smaller and the heat exchange efficiency will decrease. Hence, preferably, the mean particle size is 0.05–1 mm, more preferably, 0.1–0.7 mm, and much more preferably, 0.1–0.3 mm.

Preferably, the relative density of the granules of the regenerative material is 96% or over, more preferably, 98% or over, and much more preferably, 99% or over, it is desirable to bring it close to the theoretical density. When the relative density is less than 96%, the mechanical strength of the granules will drop because of the presence of a large number of open vacancies.

For enhancing the mechanical strength of the granules, preferably, the mean grain size is 100 mμ or under, more preferably, 50 μm or under, and much more preferably, 10 μm or under and 1 μm or over. When the mean gain size of the granules exceeds 100 μm, their mechanical strength will decrease.

Irregularities on the surface of granules may serve as starting points of their failures. Hence, preferably, the surface roughness of the granules is, for example, 10 μm or under on the maximum height (Rmax) standards defined in JIS B0601.

Preferably, the excess sulfur content in the granules is 10000 wtppm or under, more preferably, 5000 wtppm or under, and most preferably, 2000 wtppm or under. When a large amount of sulfur is present in the granules, sintering inhibition will be caused and, in tun, the mechanical strength of the granules will decrease. Control of the excess sulfur content can be done easily by, for example, controlling the an amount of $H_2S$ gas flow at the time of sulfurization of a rare earth oxide.

The granules can be produced from a rare earth metal oxysulfide powder by a variety of methods. For example, the tumbling pelletizing, a combination of the extruding and the tumbling pelletizing, the fluidized granulating, the spray dry, or the template pressing may be used. It is desirable to form the granules into spheres. After forming, the granules are sorted to have an optimal particle size and/or an optimal aspect ratio by sieving, shape classification, etc. A rare earth oxide powder may be granulated in advance by any of the above-mentioned methods, then the sulfurization may be effected. The sulfurization conditions are identical to those when an oxide powder material is used.

Formed bodies of a rare earth metal oxysulfide is to be sintered. To prevent the rare earth metal oxysulfide from being oxidized, preferably, the sintering atmosphere is vacuum ($10^{-3}$ torr or under) or an inert gas such as argon or nitrogen. Preferably, the sintering temperature is 1100–1600° C., and the sintering time is 1–10 hours.

If HIP treatment is given after sintering, the granules will become more compact and have a larger mechanical strength. The sintering atmosphere in HIP treatment is, for example, argon, and preferably, the treatment temperature is 1200–1500° C., and the pressure is 50–200 MPa To keep the surface roughness of the granules at, for example, 10 μm or under on the maximum height Rmax standards, preferably, the sintered granules are polished. For example, granules of the regenerative material and free abrasives are put into a processing vessel. If a processing fluid is needed, it will be added together with the media The work is put in the vessel or the processing vessel to be moved so as to be polished through the relative movement between the work and the abrasives or the media. For example, rotary barrel finishing, centrifugal fluidized barrel finishing, vibration barrel finishing, gyro finishing, reciprocating finishing, or linear fluidized finishing may be used.

BRIEF DESCRIPTION OF DRAWINGS

FIG. 8 shows the beat capacities of $Gd_xTb_{2-x}O_2S$ ceramics.

EMBODIMENTS

In the following, some embodiments and comparative examples will be described Regenerative materials were packed into a regenerator under a packing pressure of 100 kPa, and the helium gas transfer resistance was determined from the differential pressure between the top end and the bottom end of the regenerator. The mean aspect ratio was determined by taking a microscopic photograph of the granules after sintering and measuring the ratio of the longest dimension to the shortest dimension with an image recognition device. The degree of dust generation was determined by visual inspection of the regenerative material recovered from the regenerator and finding the ratio of broken granules. The content of the excess sulfur was determined by comparing the Gd content obtained by a chemical analysis and the sulfur content obtained by a combustion analysis. Its unit is wtppm.

Preparation of Oxysulfides and their Heat Capacities 10 g of gadolinium oxide of which mean particle size determined with Fisher method was 0.46 μm was filed in a quartz boat and the boat was put into a quartz reaction tube. While $H_2S$ gas was passed through the tube at a flow rate of 0.2 L/min, gadolinium oxide was made to react at 650° C. for 2 hours. When the reaction products were measured with x-ray diffraction analysis, only the peak of gadolinium oxysulfide, $Gd_2O_2S$ was observed. Hence the reaction yield based on the rare earth oxide was 100%. The obtained Gd$_2$O$_2$S powder was formed into discs of 12 mm in diameter under a pressure of 30 MPa The discs were pressed by a hydrostatic press under a pressure of 200 MPa, then the discs were subjected to atmospheric sintering in argon atmosphere at 1500° C. for 6 hours to obtain the Gd$_2$O2S samples (embodiment 1).

The density of the sintered Gd$_2$O$_2$S of embodiment 1 was determined to be 99.9% of the theoretical density with Archimedes' method. Its mean grain size was calculated to be 3.2 μm from the following formula:

$$d = 1.56C/(MN)$$

(wherein d: mean grain size; C: length of a line freely drawn on a high resolution image of SEM, etc.; N: number of crystal grains on the freely drawn line; M: magnification of the image.)

The excess sulfur content of the sintered Gd$_2$O$_2$S of embodiment 1 was found to be 1000 wtppm by comparing the Gd content obtained by the chemical analysis and the suffer content determined with the combustion analysis.

Figure 1:
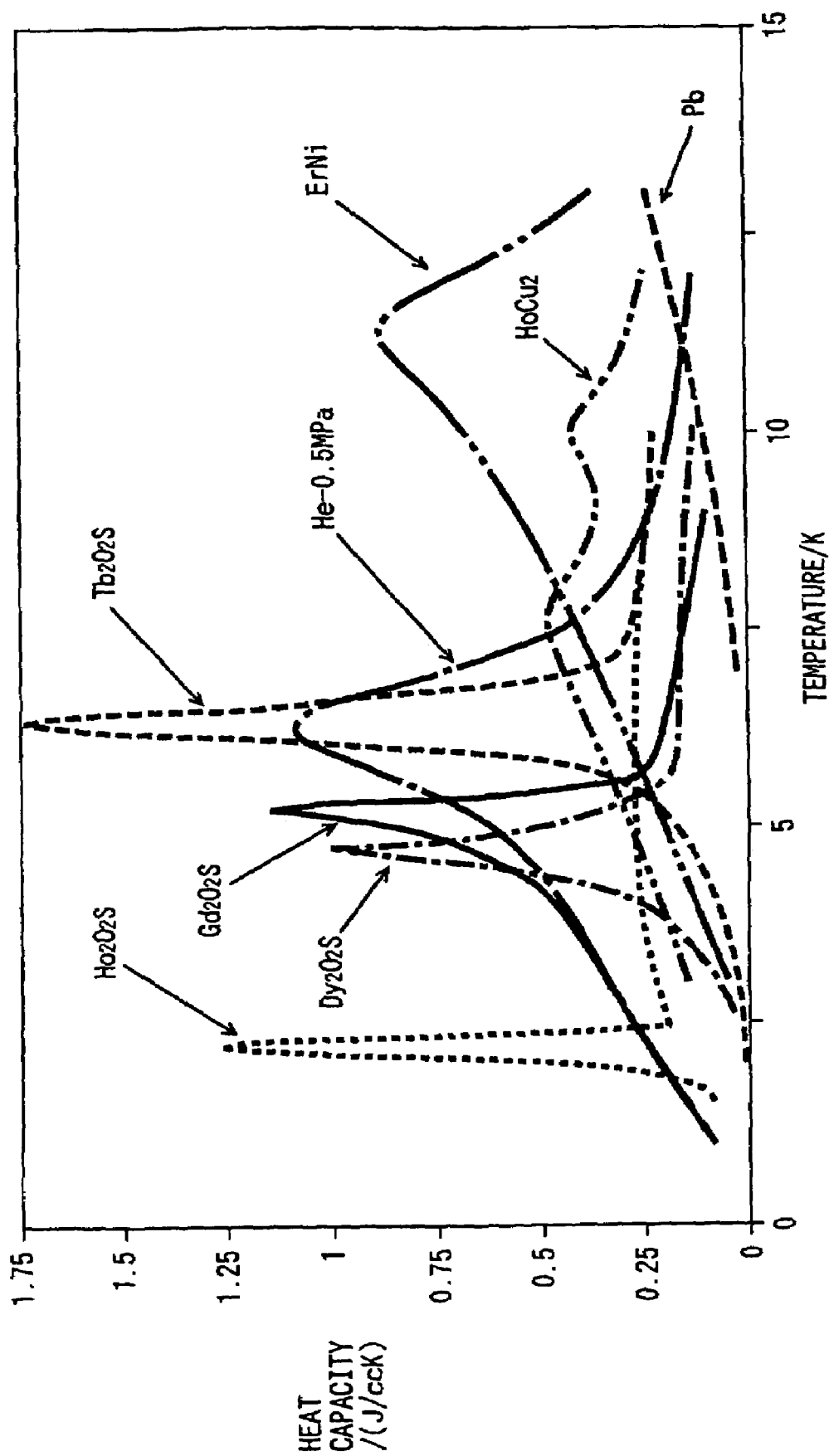
FIG. 1 shows the heat capacities of rare earth metal oxysulfide regenerative materials, helium, and conventional regenerative materials.

The heat capacity of the sintered Gd$_2$O$_2$S of embodiment 1 is shown in FIG. 1, and its magnetic phase transition temperature and its heat capacity at that temperature are shown in Table 1. Besides the sintered Gd$_2$O$_2$S, FIG. 1 shows the heat capacities of Tb$_2$O$_2$S, Dy$_2$O$_2$S and Ho$_2$O$_2$S, and for reference, the heat capacity of helium (He-0.5 MPa) and heat capacities of Pb, ErNi and HoCu$_2$ being the conventional regenerative materials. The Gd$_2$O$_2$S regenerative material of embodiment 1 had its magnetic phase transition temperature in the neighborhood of 5 K, and its heat capacity at the magnetic phase transition temperature is 1.2 J/cc·K; the Gd$_2$O$_2$S regenerative material had a heat capacity 3 to 5 times as large as those of the conventional regenerative materials such as HoCu$_2$ or ErNi in the neighborhood of the liquid helium temperature.

TABLE 1

Magnetic Phase Transition Temperatures

| Sample | Composition | Magnetic phase transition temperature/K | Heat capacity/ J/cc · K |
|---|---|---|---|
| Embodiment 1 | Gd$_2$O$_2$S | 5.2 | 1.2 |
| Embodiment 2 | Ho$_2$O$_2$S | 2.2 | 1.25 |
|  | Dy$_2$O$_2$S | 4.6 | 1.0 |
| Embodiment 3 | Gd$_{1.8}$Tb$_{0.2}$O$_2$S | 4.8 | 0.84 |
|  | Gd$_1$Tb$_1$O$_2$S | 4.2 | 0.61 |
|  | Tb$_{1.8}$Gd$_{0.2}$O$_2$S | 5.3 | 1.3 |
|  | Tb$_2$O$_2$S | 6.3 | 1.7 |
| Embodiment 4 | Dy$_{1.8}$Ho$_{0.2}$O$_2$S | 4.3 | 0.8 |
|  | Ho$_{1.8}$Dy$_{0.2}$O$_2$S | 2.4 | 0.85 |
| Embodiment 5 | Gd$_{1.8}$Y$_{0.2}$O$_2$S | 4.6 | 0.75 |
|  | Gd$_{1.8}$La$_{0.2}$O$_2$S | 4.6 | 0.85 |
|  | Gd$_{1.8}$Ce$_{0.2}$O$_2$S | 4.7 | 0.74 |
|  | Gd$_{1.8}$Pr$_{0.2}$O$_2$S | 4.7 | 0.69 |
|  | Gd$_{1.8}$Nd$_{0.2}$O$_2$S | 4.8 | 0.77 |
|  | Gd$_{1.8}$Sm$_{0.2}$O$_2$S | 4.8 | 0.63 |
|  | Gd$_{1.8}$Eu$_{0.2}$O$_2$S | 4.9 | 0.76 |
|  | Gd$_{1.8}$Dy$_{0.2}$O$_2$S | 4.9 | 0.82 |
|  | Gd$_{1.8}$Ho$_{0.2}$O$_2$S | 4.9 | 0.71 |
|  | Gd$_{1.8}$Er$_{0.2}$O$_2$S | 5 | 0.81 |
|  | Gd$_{1.8}$Tm$_{0.2}$O$_2$S | 5 | 0.73 |
|  | Gd$_{1.8}$Yb$_{0.2}$O$_2$S | 5.1 | 0.76 |
|  | Gd$_{1.8}$Lu$_{0.2}$O$_2$S | 5.2 | 0.8 |

The gadolinium oxide Gd$_2$O$_3$ used in embodiment 1 was used without sulfurization to prepare a sintered material under the same conditions of embodiment 1 (comparative example 1). The magnetic phase transition temperature of this sample was in the neighborhood of 1 K, and its heat capacity in the neighborhood of 4.2 K was extremely small.

Holmium oxide, of which mean particle size was 0.36 μm, and dysprosium oxide, of which mean particle size was 0.6 μm, were subjected sulfurization, forming, hydrostatic pressing and sintering in the same manner as embodiment 1 to obtain a sintered Ho$_2$O$_2$S and a sintered Dy$_2$O$_2$S (embodiment 2). The heat capacities of the sintered materials obtained are shown in FIG. 1, and their magnetic phase transition temperatures and their heat capacities at those temperatures are shown in Table 1, respectively. They exhibited larger heat capacities in wide ranges of temperatures in the neighborhood of the liquid helium temperature than those of HoCu$_2$ and ErNi.

Composite Oxysulfides

A mixture of the gadolinium oxide powder used in embodiment 1 and terbium oxide powder of which mean particle size was 0.69 μm was subjected to sulfurization, forming, hydrostatic pressing and sintering in the same manner as embodiment 1 to obtain sintered gadolinium-terbium oxysulfides (Gd$_x$Tb$_{2-x}$O$_2$S) (embodiment 3). X-ray diffraction patterns of the four kinds of sintered materials of which compositions were varied within the range of $0 \leq x \leq 2$ (x=0.2, 1.0, 1.8, and 2.0) were measured. For x=2.0, only the peak of Tb$_2$O$_2$S was observed For x=0.2, 1.0 and 1.8, peaks corresponding to solid dissolved Gd$_x$Tb$_{2-x}$O$_2$S which did not belong to Gd$_2$O$_2$S nor Tb$_2$O$_2$S were obtained.

Figure 2:
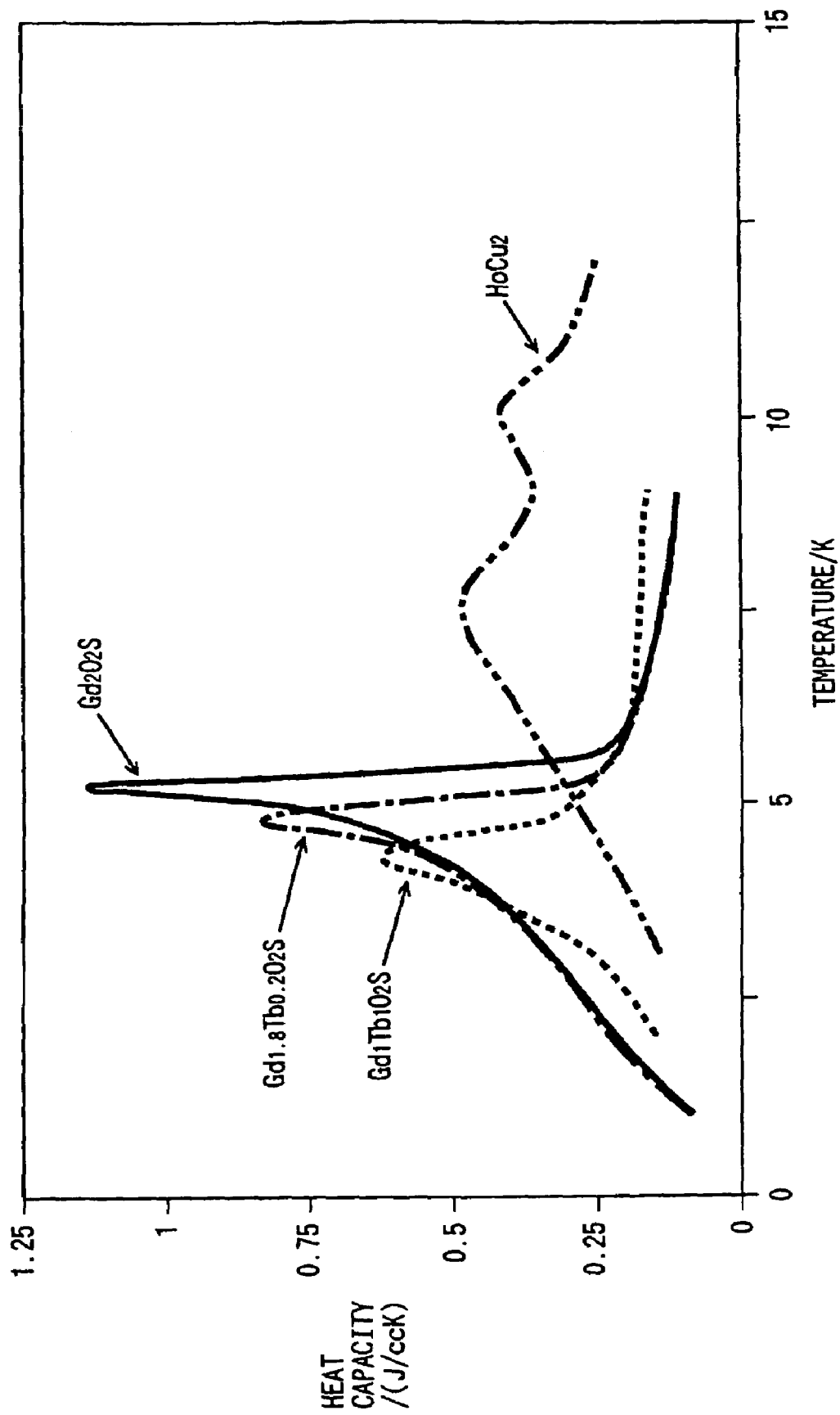
FIG. 2 shows the heat capacities of Gd-rich $Gd_{2-x}Tb_xO_2S$ rare earth metal oxysulfide regenerative materials of the embodiments.
Figure 3:
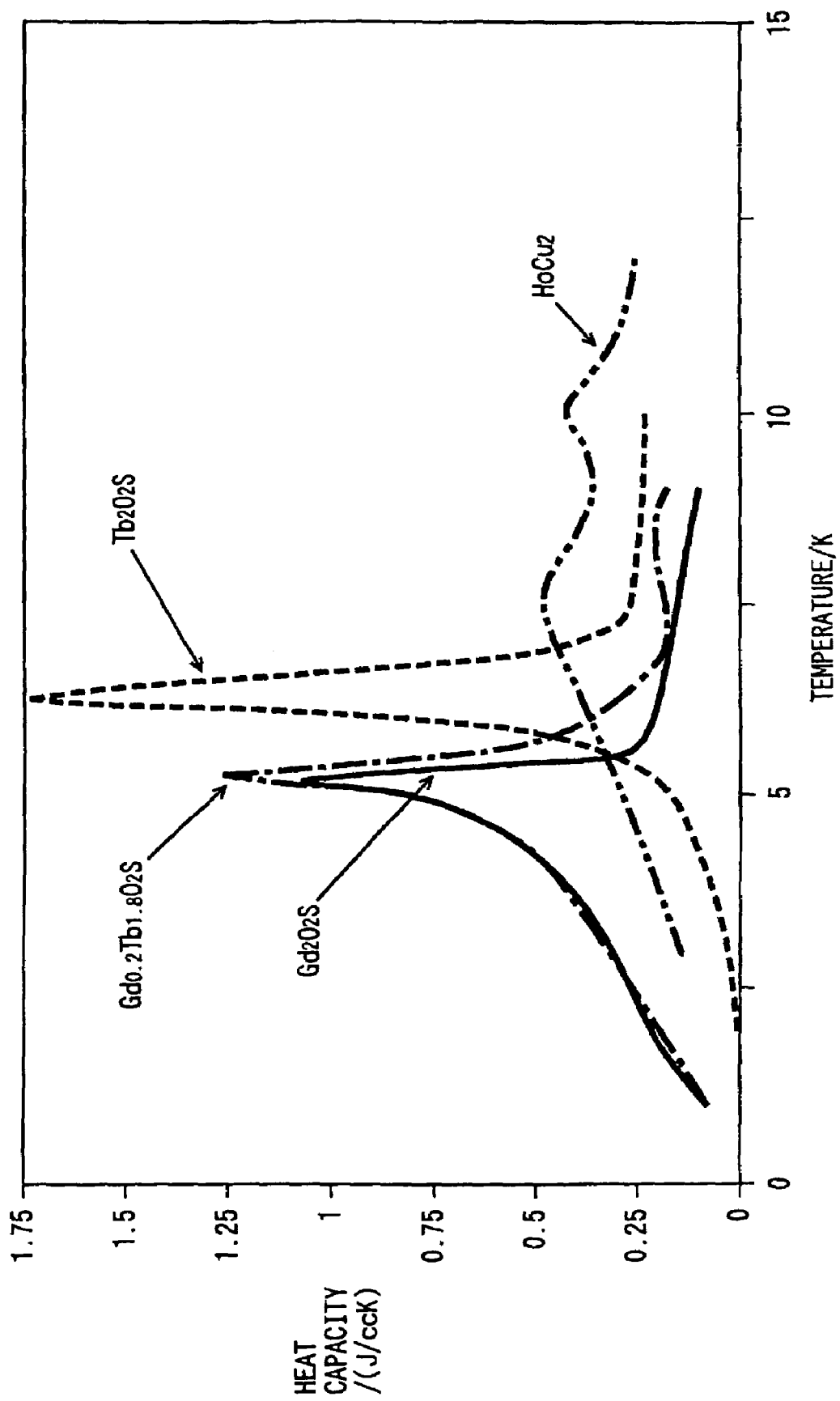
FIG. 3 shows the heat capacities of Tb-rich $Gd_{2-x}Tb_xO_2S$ rare earth metal oxysulfide regenerative materials.

The heat capacities of sintered Gd$_x$Tb$_{2-x}$O$_2$S of embodiment 3 are shown in FIG. 2, and their magnetic phase transition temperatures and their heat capacities at these temperatures are shown in Table 1. As the value of x decreases to 1.8, then to 1, the heat capacity at the time of magnetic phase transition decreases, whereas the magnetic phase transition temperature shifts to the lower temperature side of that of Gd$_2$O$_2$S, the peak width of the specific heat increases, and the heat capacity exceeds that of Gd$_2$O$_2$S at the liquid helium temperature. On the other hand, as shown in Table 1 and FIG. 3, as the composition approaches to that of Tb$_2$O$_2$S, the magnetic phase transition temperature shifts to the higher temperature side of that of Gd$_2$O$_2$S.

Generally speaking, the magnetic interaction of rare earth magnetic atoms in a crystal depends on the interatomic distance. If the crystal is perfect and the interatomic distances of magnetic atoms are identical the magnetic interaction can be expressed with a single parameter, and the magnetic spin system of the crystal as a whole makes a sharp phase transition. In that case, as is the case of embodiment 1, the peak of the specific heat becomes higher and sharper due to the phase transition. On the other hand, as is the case of embodiment 3, when a plurality of rare earth elements are solid dissolved, the interatomic distances of magnetic atoms will be varied locally, and the crystal field will be disturbed locally, resulting in the loss of uniformity of the magnetic interaction of the entire crystal. As a result, the magnetic phase transition of the magnetic spins in the crystal will be locally disturbed, and the peak of the specific heat will be dispersed in a certain temperature range, resulting in an expansion of the specific heat peak width. In a Ho system, this is accompanied by a shift of the magnetic phase transition temperature to the higher temperature side, and in Gd, Td and Dy systems, the magnetic phase transition temperature shifts to the lower temperature side.

Figure 4:
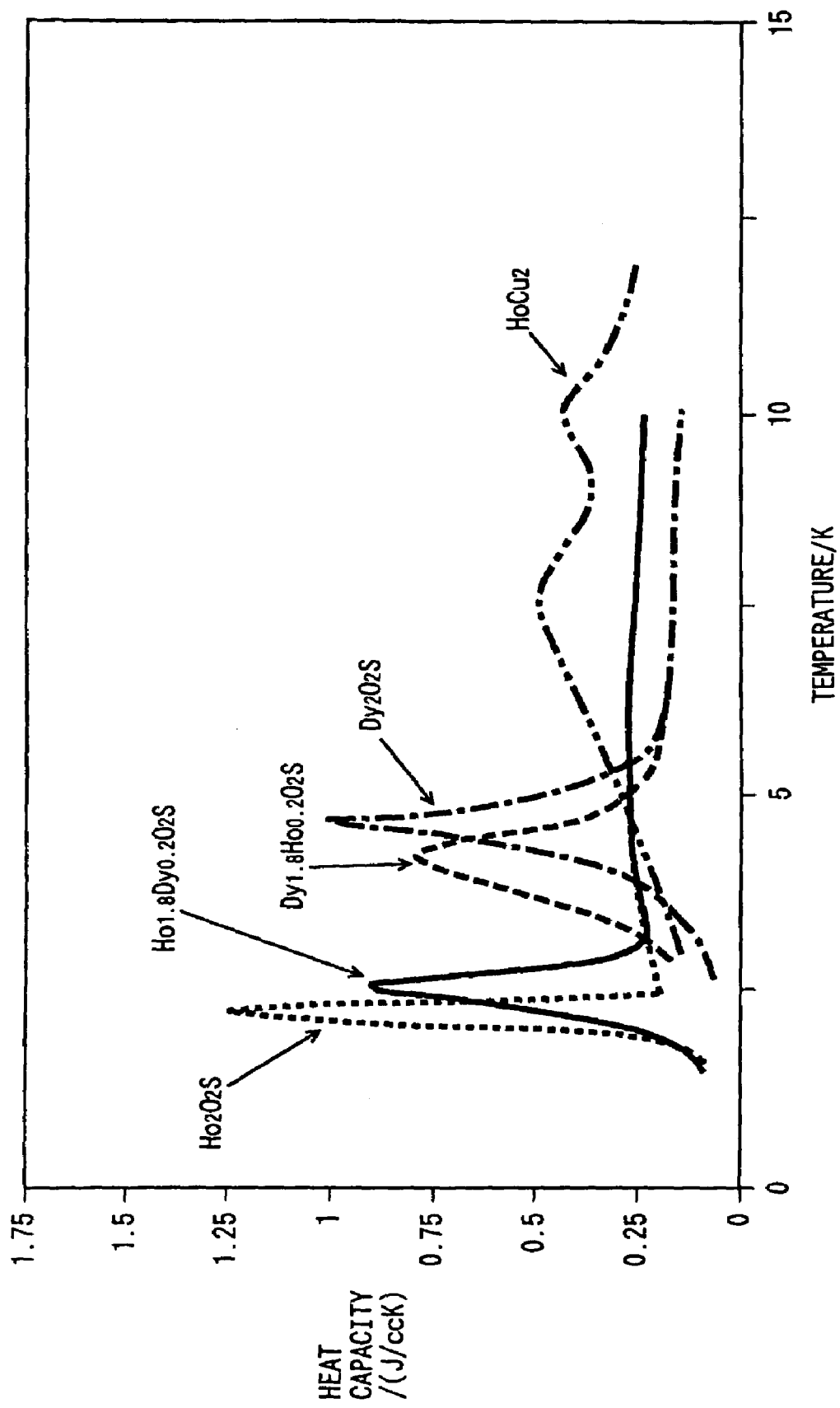
FIG. 4 shows the heat capacities of Ho-Dy composite rare earth metal oxysulfide regenerative materials.

The holmium oxide powder and the dysprosium oxide powder, which were used in embodiment 2, were mixed and the mixture was subjected to sulfurization, forming, hydrostatic pressing and sintering in the same manner as embodiment 1 to obtain sintered dysprosium-holmium composite oxysulfides, $Dy_xHo_{2-x}O_2S$ (embodiment 4). The heat capacities of the sintered materials are shown in FIG. 4, and their magnetic phase transition temperatures and their heat capacities at those temperatures are shown in Table 1. Magnetic phase transition temperatures that are between those of $Dy_2O_2S$ and $Ho_2O_2S$ were obtained successfully by changing the value of x, and the peak width of the specific heat were successfully expanded wider than those of $Dy_2O_2S$ and $Ho_2O_2S$.

Gadolinium oxide (90 mol %) and rare earth oxides (10 mol %) of Y, La, Ce, Pr, Nd, Sm, Eu, Dy, Er, Tm, Yb and Lu were treated in the same manner as embodiment 3 to obtain sintered composite rare earth metal oxysulfides (embodiment 5). Their magnetic phase transition temperatures (Tc) and their heat capacities at those temperatures are shown in Table 1. With the use of various composite rare earth metal oxysulfides, a variety of magnetic phase transition temperatures can be obtained, and the peak value of the specific heat at the magnetic phase transition temperature can be changed. The rare earth oxides used in embodiments 3 and 5 were treated intact as oxides, without sulfurization, and treated in the same manner as embodiment 3 to obtain sintered materials (comparative example 2). Their heat capacities in the neighborhood of 4.2 K were extremely small.

Regenerative Material Granules

The $Gd_2O_2S$ powder obtained in embodiment 1 was spherically formed by the tumbling pelletizing, and the obtained granules were sieved with two kinds of nylon meshes (mesh A (opening 308 μm) and mesh B (opening: 190 μm)). The sieved granules were made to roll over a mirror-finished iron plate tilted at about 25°. The granules which rolled down were recovered to make shape classification. The mean particle size and the mean aspect ratio of 100 granules were 0.25 mm and 1.1, respectively. The mean particle size and the mean aspect ratio of the $Gd_2O_2S$ granules were measured on an image taken with a video high scope system.

The obtained $Gd_2O_2S$ granules were filled in a crucible of alumina, and the granules were put in a sintering furnace and subjected to atmospheric sintering. Then the furnace was fully vacuum-pumped, and argon gas was introduced to sinter the granules in argon atmosphere. The sintering temperature was 1500° C. and the sintering time was 6 hours. Thus the desired $Gd_2O_2S$ regenerative material was obtained. The density of the $Gd_2O_2S$ regenerative material measured by the pycnometer, was 99.2% of the theoretical density. The mean grain size and the sulfur content were identical to those of embodiment 1.

Nylon media and alumina slurry of 10 wt % concentration were put in a processing vessel, then the $Gd_2O_2S$ regenerative material was put into the vessel to give surface treatment with rotary barrel finishing and obtain granules of the regenerative material (embodiment 6). When the treatment time was 6 hours, the surface roughness of the granules was 1 μm. The surface roughness was measured with a scanning tunneling microscope (STM surface roughness meter). The obtained $Gd_2O_2S$ regenerative material was packed in the cooling section of a GM refrigerator at a packing rate being close to the closest packing. Then He gas of which heat capacity was 25 J/K was subjected to the GM refrigeration operation cycle continuously repeating for 500 hours under a mass flow rate of 3 g/sec and gas pressure of 16 atm. At that time point, the transfer resistance of He gas flowing through the regeneration section was measured No increase in the transfer resistance was observed after the start of the operation. After 1000 hours of continuous operation, the $Gd_2O_2S$ regenerative material was taken out and examined. There were no pulverized granules.

The following samples were prepared by sulfurization, forming, classification, sintering and polishing of granules of rare earth metal oxysulfides under conditions similar to those of embodiment 6. The conditions of preparation were similar to those of embodiment 6 except some points specified otherwise. The sample numbers were given consecutively, starting with embodiment 1 as sample 1.

Granules were made under the conditions similar to those of embodiment 6 except that the inclined angle of the iron plate was changed. Then the granules were sintered and polished (samples 2 and 3). The residual granules of the shape classification of embodiment 6, of which aspect ratios exceeded 3, were sintered and polished (sample 4). The helium gas transfer resistance and the degree of dust generation of each sample were evaluated by the GM refrigeration operation cycle used in embodiment 6. The results are shown in Table 2. When the mean aspect ratio was less than 3, good results were obtained just like embodiment 6. When the mean aspect ratio exceeded 3, the helium gas transfer resistance increased by 30 to 40% after 500 hours of continuous operation. After 1000 hours of continuous operation, the ratio f finely broken granules reached to 20–30%.

TABLE 2

Effects of the Aspect Ratio

| Sample | Classification angle/° | Mean aspect ratio | Increase of He gas transfer resistance | Degree of dust generation |
|---|---|---|---|---|
| 1 | 25 | 1.1 | None | No problem |
| 2 | 30 | 1.3 | None | No problem. |
| 3 | 40 | 1.8 | None | No problem |
| 4 | — | 3.2 | Increased by 30–40% after 500 hrs operation | 20–30% of granules were broken after 1000 hrs operation. |

Sintering Conditions

Sintered granules were prepared under conditions similar to those of embodiment 6 except that the sintering temperature or the sintering time was changed to alter the grain size (samples 5 through 9). Influences of the changes in the grain diameter on the helium gas transfer resistance and the degree of dust generation were evaluated with the GM refrigeration operation cycle used in embodiment 6. The results are shown in Table 3. Good results were obtained for granules of which grain sizes were 100 μm or under, samples 1 and 5–7. However, for samples 8 and 9, of which grain sizes exceeded 100 μm, the He gas transfer resistance increased by 20 to 30% after 500 hours of continuous operation, and the ratios of finely broken granules rose to 10–15% after 1000 hours of continuous operation.

Influences of Excess Sulfur

The gas flow rate for sulfurization was varied to prepare various $Gd_2O_2S$ powders. These powders were granuled and sintered in the same manner as embodiment 6. The content of excess sulfur influences the relative density as well as the He gas transfer resistance and the degree of dust generation. Hence the He gas transfer resistance and the degree of dust generation were evaluated with the GM refrigeration operation cycle used in embodiment 6. The results are shown in Table 5. When the relative density of the granules was 96% or over, as were the cases of samples 1, 13 and 14, good results were obtained. When the relative density of the granules was less than 96%, as was the case of sample 15, the increase of He gas transfer resistance rose to 15–20% after 500 hours of continuous operation, and as for the state of breakage of granules after 1000 hours of continuous operation, the ratio of finely broken granules rose to about 5–10%. Preferably, to keep the relative density at 96% or over, the excess sulfur content is 10,000 wtppm or under. More preferably, to keep the relative density at 98% or over, the excess sulfur content is 5000 wtppm or under. Most preferably, to keep the relative density at 99% or over, the excess sulfur content is 1000 wtppm or under.

TABLE 3

Sintering Conditions and Durability

| Sample | Sintering temp./° C. | Sintering time/Hr | Mean grain size/μm | Increase of He gas transfer resistance | Degree of dust generation |
|---|---|---|---|---|---|
| 1 | 1500 | 6 | 3.7 | None | No problem |
| 5 | 1550 | 6 | 23 | None | No problem |
| 6 | 1600 | 6 | 85 | None | No problem |
| 7 | 1600 | 3 | 37 | None | No problem |
| 8 | 1650 | 6 | 110 | 20–30% after 500 hours of operation | 10–15% of granules failed |
| 9 | 1600 | 15 | 121 | 20–30% after 500 hours of operation | 10–15% of granules failed |

Surface Roughness

The surface treatment time was varied to induce differences in the surface roughness. The He gas transfer resistance and the degree of dust generation in relation to the surface roughness were evaluated with the GM refrigeration operation cycle used in embodiment 6. The results are shown in Table 4. When the surface roughness was 10 μm or under, as were the cases of samples 1, 10 and 11, good results were obtained. When the surface roughness exceeded 10 μm, as was the case of sample 12, the He gas transfer resistance increased by 20–30% after 500 hours of continuous operation, and the ratio of finely broken granules rose to about 15–20% after 1000 hours of continuous operation.

TABLE 4

Surface Roughness and Durability

| Sample | Surface treatment time/Hr | Surface roughness/μm | Increase of He gas transfer resistance | Degree of dust generation |
|---|---|---|---|---|
| 1 | 6 | 1 | None | No problem |
| 10 | 4 | 5 | None | No problem |
| 11 | 2 | 8 | None | No problem |
| 12 | 0 | 12 | 20–30% after 500 hours of operation. | 15–20% of granules failed |

TABLE 5

Effects of Excess Sulfur

| Sample | $H_2S$ gas flow rate (L/min) | Sulfur content/wtppm | Relative density/% | Increase of He gas transfer resistance | Degree of dust generation |
|---|---|---|---|---|---|
| 1 | 0.2 | 1000 | 99.2 | None | No problem |
| 13 | 1 | 5000 | 98.3 | None | No problem |
| 14 | 1.25 | 7000 | 97.6 | None | No problem |
| 15 | 2.5 | 12500 | 95.1 | 15–20% after 500 hours of operation | 5–10% of granules failed |

Refrigerating Capacity

Figure 5:
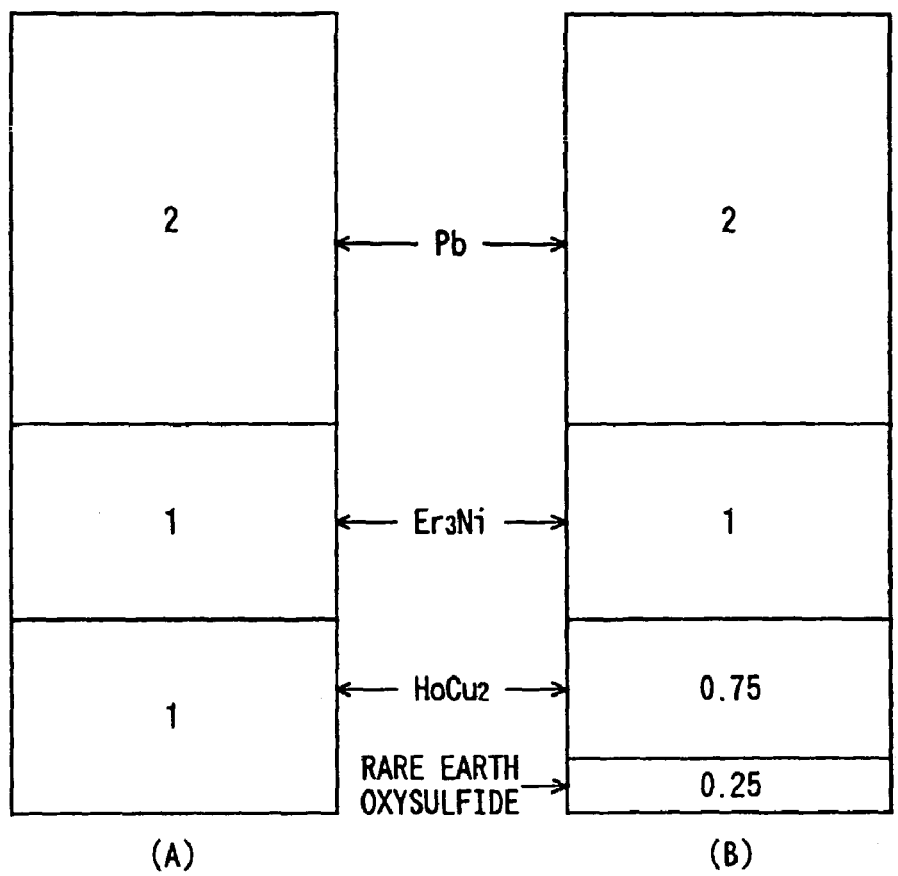
FIG. 5 shows the construction of a conventional regenerator (A) and that of the regenerator (B) of the embodiment.
Figure 6:
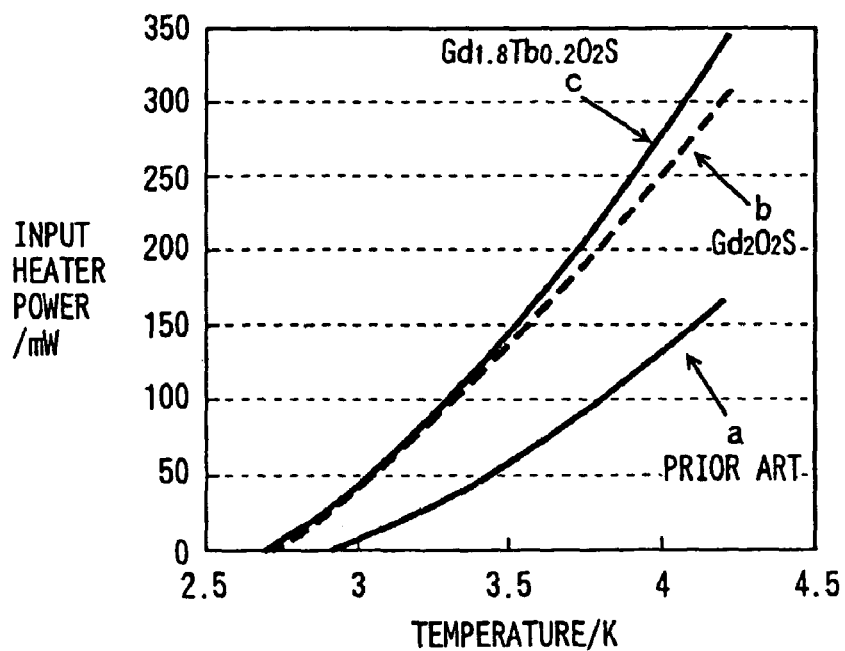
FIG. 6 shows the refrigerating capacity of a conventional regenerator (a) and those of the regenerators of the embodiments (b) and (c).

The refrigeration characteristics of the $Gd_2O_2S$ regenerative material prepared in embodiment 6 and the $Gd_{1.8}Tb_{0.2}O_2S$ regenerative material prepared by a method similar to that of embodiment 6 were examined with a regenerative type pulse-tube refrigerator of which power consumption was 3.3 kW. Two stages of regenerators were provided in the refrigerator. Pb was used for the regenerator of the first stage of the higher temperature side, and regenerative materials were packed in the regenerator of the second stage. FIG. 5(A) shows the construction of a regenerator of the second stage in a conventional case. The regenerator was packed with Pb, ErNi and $HoCu_2$ in the descending order of temperature, and their volume ratio was 2:1:1. The refrigeration characteristics of the conventional case are shown in FIG. 6($a$). The output of this refrigerator at 4.2 K was about 165 mW and the lowest achieved temperature with no application was about 2.9 K.

On the other hand, the lower-temperature side 25 volume % of the $HoCu_2$ regenerative material of this regenerator was substituted with the $Gd_2O_2S$ regenerative material or the $Gd_{1.8}Tb_{0.2}O_2S$ regenerative material to examine the resulting refrigeration characteristics. The construction of the regenerator of the embodiment is shown in FIG. 5(B). The refrigeration characteristics of the $Gd_2O_2S$ regenerative material are shown in FIG. 6($b$), and the refrigeration characteristics of the $Gd_{1.8}Tb_{0.2}O_2S$ regenerative material are shown in FIG. 6($c$). When the $Gd_2O_2S$ regenerative material was used, the output at 4.2 K was about 300 mW, and the lowest achieved temperature with no application was about 2.7 K. When the $Gd_{1.8}Tb_{0.2}O_2S$ regenerative material was used, the output at 4.2 K was about 340 mW, and the lowest achieved temperature with no application was about 2.65 K.

Figure 7:
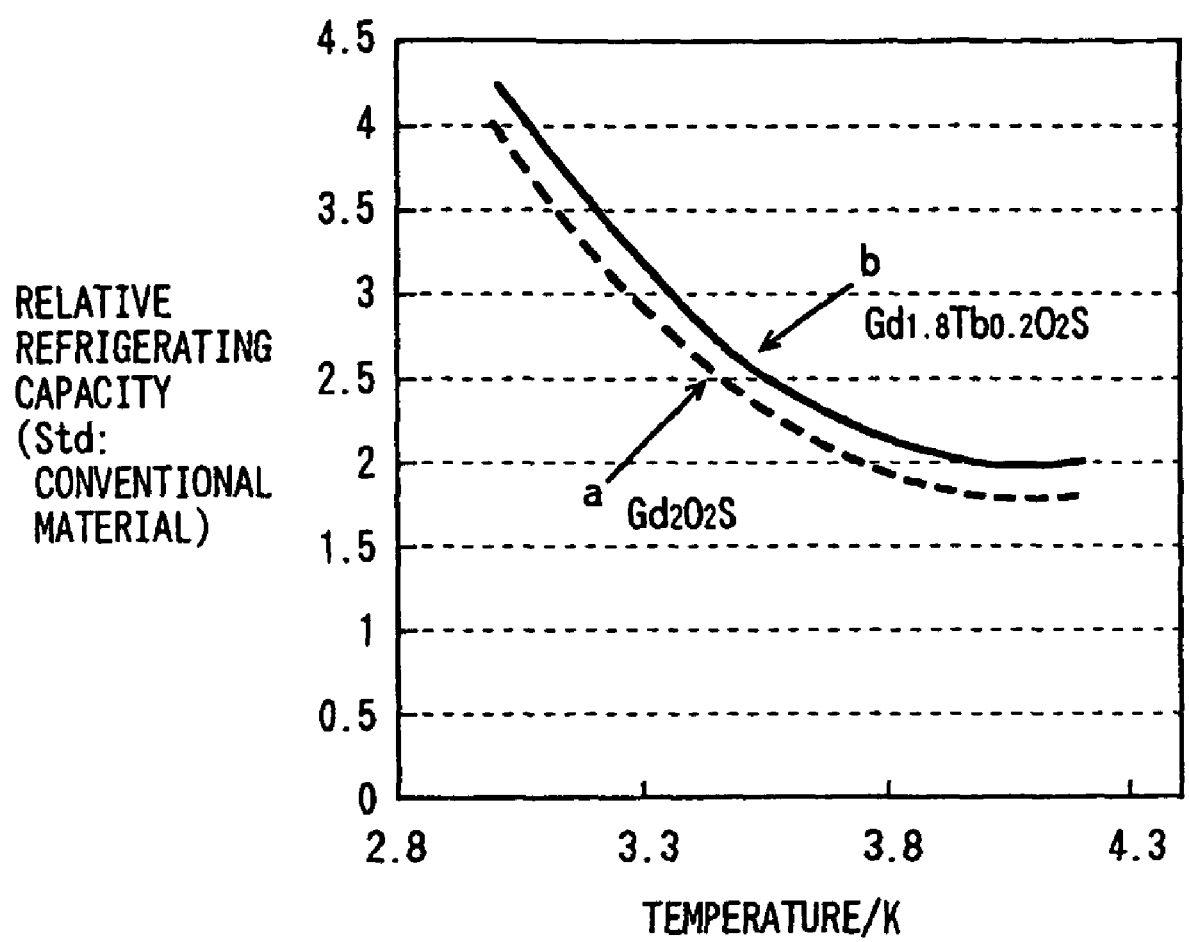
FIG. 7 shows the relative refrigerating capacities of a conventional regenerator and a regenerator of an embodiment.

The relative refrigerating capacities of regenerators using $Gd_2O_2S$ and $Gd_{1.8}Tb_{0.2}O_2S$ regenerative materials of FIGS. 6($b$) and ($c$) are shown in FIG. 7, with the refrigerating capacity of the conventional regenerator being set at 1. The refrigerating capacity, at 4.2 K, of the regenerator packed with the $Gd_2O_2S$ regenerative material (dashed line a) was about twice that of the conventional regenerator, and with the drop in temperature, the factor of the regenerating capacity increased and reached to 4 times at 3 K. The refrigerating capacity of the $Gd_{1.8}Tb_{0.2}O_2S$ regenerative material (continuous line b) was twice or more at 4.2 K, and with the drop in temperature, the factor of the refrigerating capacity increased and reached to 4.5 times at 3 K.

Influences of the Mean Particle Size of Granules on Refrigerating Capacity

The size of the opening of the meshes used for sieving was varied to prepare regenerative material granules of varied mean particle sizes. Other conditions were similar to those of embodiment 6. The refrigeration characteristics of the prepared granules were evaluated similarly. The results are shown in Table 6. When the mean particle size of the granules was 0.05 mm or over and 1 mm or under, as were the cases of samples 16 through 18, high outputs were obtained at 4.2 K. When the particle size of the granules were off this range, as were the cases of samples 19 and 20, the outputs at 4.2 K decreased. Accordingly, preferably, the mean particle size of the granules is 0.05 mm or over and 1 mm or under, and more preferably, 0.1–0.7 mm, and more preferably, 0.1–0.3 mm, and most preferably, 0.2–0.3 mm.

TABLE 6

Influences of the Mean Particle Size

| Sample | Mean particle size of granules/mm | Output at 4.2 K/mW |
|---|---|---|
| 16 | 0.25 | 300 |
| 17 | 0.77 | 290 |
| 18 | 0.071 | 285 |
| 19 | 1.1 | 200 |
| 20 | 0.045 | 185 |

Comparative Example 3

Rare Earth Oxide Regenerative Materials

The refrigeration characteristics of $Gd_2O_3$ granules, which were prepared under forming, classification and sintering conditions similar to those of embodiment 6, were evaluated similarly. The output at 4.2 K was about 100 mW, and the lowest achieved temperature with no application was about 3.5 K. The results were inferior to those of the conventional example ($HoCu_2$) in both terms, namely, the output and the lowest achieved temperature of the regenerator.

Supplement

As for the volume ratio of the $HoCu_2$ regenerative material and the rare earth metal oxysulfide regenerative material, preferably, $HoCu_2$ is 20–80% and the rare earth metal oxysulfide is 80–20%. When a Tb-based oxysulfide is arranged on the higher temperature side of a Gd-based oxysulfide, it is preferred that $HoCu_2$ is arranged on the higher temperature side of the latter to secure a refrigerating capacity up to 7 K. When $Gd_{0.1}Tb_{1.9}O_2S$ was prepared as an oxysulfide including Tb as the main component, a regenerative material was obtained, of which peak of specific heat shifted a little to the lower temperature side than $Tb_2O_2S$ but other characteristics were similar to those of $Tb_2O_2S$.

Best Embodiment (Addition of Toughenings)

In the following, some embodiments will be indicated, to which an additive such as $ZrO_2$ was added to a rare earth metal oxysulfide to enhance the strength and the durability. To distinguish these embodiments from the above-mentioned embodiments to which no additive was added, the former embodiments were designated as embodiments 11 through 28. The rare earth metal oxysulfides to which no additive was added were designated as examples 1 through 12. The related tables were designated as tables 11 through 21.

The addition of an additive did not produce much difference in the magnetic phase transition temperatures of the rare earth metal oxysulfide regenerative materials in comparison with those of the materials without any additive. When an additive is less than 0.05 wt %, the durability in case of long hours of operation of the refrigerator poses a problem. When the addition exceeds 30 wt %, the specific heat of the regenerative material decreases.

Besides the $R_2O_2S$ phase, when an additive is added, a second phase which includes the additive and has a composition differing from that of the main phase will be formed. As a result, the crystal grain growth of the main phase will be restrained, and the strength will increase due to the inclusion of the second phase of relatively high strength. Additives may be regarded as toughenings to the rare earth metal oxysulfide ceramics microstructure. Preferable additives include $Al_2O_3$, $ZrO_2$, mullite, $Si_3N_4$, Sialon, TiN AlN, BN, SiC and TiC; in particular, $ZrO_2$, $Si_3N_4$, Sialon, TiN, AlN, BN, SiC and TiC are preferable. Besides them, oxides of Mg, Ca, Sr and Ba, and oxides of transition metal elements of atomic numbers 22 (Ti)–31 (Ga) and 72 (Hf) are preferable as additives. In the following, for simplicity, these oxides are referred to as alkaline earth metal oxides and transition metal oxides.

When any of $Al_2O_3$, $ZrO_2$, mullite, $Si_3N_4$, Sialon, TiN, AlN, BN, SiC, TiC, alkane earth metal oxides and transition metal oxides is added, besides the $R_2O_2S$ phase as the main phase, a second phase will be formed, and with it, the crystal grain growth of the main phase will be restrained, and the strength of the rare earth metal oxysulfide regenerative material will increase. Accordingly, even if the refrigerator is operated for long hours, the regenerative material granules will not break down or the sealing part or the like of the refrigerator will not be damaged.

To produce a rare earth metal oxysulfide regenerative material with an additive, the additive or the precursor thereof is added at a concentration of 0.05–30 wt % to, for example, a powder having a general formula $R_2O_2S$, and the mixture is formed into, for example, granules. Or the additive or the precursor thereof in the form of powder is added to a raw material, rare earth oxide powder. A gas containing sulfur atom of oxidation number −2 such as $H_2S$ or $CH_3SH$ is flowed into the raw material under heating to make them react to produce an oxysulfide. Then the oxysulfide is formed into, for example, granules. Next, these granules are sintered at, for example, 1400–1600° C. for 1–10 hours. The relative density of the resulting rare earth metal oxysulfide regenerative material was 98% or over, and the mean grain size was 20 μm or under.

For example, an additive or its precursor is added to a rare earth oxide powder available in the market, and the mixture is mixed in a ball mill or the like. After the addition, the mixed powder is sintered at about 800–1100° C., and the sintered mixed powder is filled in a reaction tube of quartz or the like. Then a gas containing $H_2S$ is flowed through the powder to make sulfurization. As a result, the desired rare earth metal oxysulfide powder is obtained. A rare earth oxide powder may be made to undergo the sulfurization reaction, and after that, an additive or its precursor may be mixed with the powder.

The packing of the regenerative material into the regenerator was done at a packing pressure of 100 KPa as before. As for the distinction between the $R_2O_2S$ phase as the main phase and the second phase differing from the main phase in the microstructures of the sintered material, the kinds of phases were determined by X-ray diffraction, and the distribution of phases was examined with a metallograph. The ratio of the main phase and the second phase was determined by grinding and polishing the surface of the sintered material, photographing the specimen surface through a metallograph, measuring the ratio with an image recognition device, and converting the area ratio to the volume ratio. The mean aspect ratio of the granules was determined by photographing the sintered granules through a microscope and measuring the ratio of the longer dimension and the shorter dimension with an image recognition device. The state of breakage of the granules was determined by visually examining the regenerative material recovered from the regenerator and finding the ratio of broken granules.

EXAMPLE 1

A rare earth metal oxysulfide was prepared by the same manner as embodiment 1 (the programming rate for temperature up was 200° C./h). This sample was designated as example 1.

Embodiment 11 Addition of Zirconia

The gadolinium oxide used in example 1 and partially stabilized zirconia ($3Y—ZrO_2$, 3 mol % $Y_2O_3$—97 mol % $ZrO_2$; the same was used in the following) were put in a ball mill and mixed for 24 hours with ethanol as a solvent. The resulted slurry was dried and calcined (900° C.×3 hours). The product was made to react with hydrogen sulfide gas to prepare $Gd_2O_2S$ ceramics containing Zr (Zr-doped $Gd_2O_2S$) in the same manner as example 1 (hydrostatic pressing at 200 MPa, then atmospheric sintering in argon atmosphere at 1500° C. for 6 hours). The density of the resulting Zr-doped $Gd_2O_2S$ was determined to be 99.9% of the theoretical density by Archimedes' method, and the mean grain size was 1.1–1.5 μm. Table 11 shows the heat capacity at the magnetic phase transition temperature (the temperature of the highest peak of the heat capacity) corresponding to the amount of addition of $ZrO_2$, and the heat capacity at 4.2K. As can be seen in Table 11, with the addition of $ZrO_2$, the heat capacity at the magnetic phase transition temperature decreases, but when the addition is 30 wt % or under, the heat capacity at 4.2K is 0.3 J/cc·K or over. When the beat capacity exceeds 0.3 J/cc·K, there will be no large influences on the cooling characteristics of the regenerator.

These samples were ground and polished, and the sample faces were subjected to X-ray diffraction to determine the kinds of phases. The distribution of phases was examined under a metallograph. The presence of a phase differing from the main phase was confirmed. It was $ZrO_2$ phase evenly dispersed through the main phase. Image analysis also revealed that with the increase in the addition of $ZrO_2$, the ratio of $ZrO_2$ phase increases. This phase is considered to be $ZrO_2$ which precipitated because it could not be solid dissolved in the main phase. The details, however, are not clear yet. Naturally, the cause of the decrease in the heat capacity at 4.2 K with the increase in the addition of $ZrO_2$ is the increase of the $ZrO_2$ phase. These observations were also true when the kinds of the rare earth elements were changed. The reason is that they are the properties concerning ceramics microstructures and heat capacity when the second phase such as $ZrO_2$ is present through $R_2O_2S$ phase as the main phase. These properties do not basically depend on the kinds of rare earth elements when the additive is the same.

TABLE 11

Addition of Partially Stabilized ZrO$_2$

| Sample | Amount of additive/wt % | Heat capacity at the magnetic phase transition temp./ J/cc · K | Heat capacity at 4.2 K/ J/cc · K |
|---|---|---|---|
| Example 1 | Non-dope | 1.2 | 0.50 |
| Embodiment 11 | 0.1 | 1.2 | 0.50 |
| " | 0.5 | 1.1 | 0.50 |
| " | 1 | 1.0 | 0.50 |
| " | 10 | 0.89 | 0.48 |
| " | 20 | 0.66 | 0.38 |
| " | 30 | 0.49 | 0.32 |
| " | 40 | 0.38 | 0.23 |

Embodiment 12 Addition of Alumina

Gd$_2$O$_2$S ceramics containing Al$_2$O$_3$ (Al-doped Gd$_2$O$_2$S) were prepared with Al$_2$O$_3$ instead of partially stabilized zirconia (3Y—ZrO$_2$). The other conditions were similar to those of embodiment 11. The density of the resulting Al-doped Gd$_2$O$_2$S was determined to be 99.9% of the theoretical density by Archimedes' method, and the mean grain size was 1.1–1.5 μm. Table 12 shows the heat capacity at the magnetic phase transition temperature (the temperature of the highest peak of heat capacity) corresponding to the amount of addition of Al$_2$O$_3$, and the heat capacity at 4.2K. As can be seen in Table 12, with the addition of Al$_2$O$_3$, the heat capacity at the magnetic phase transition temperature decreases, but when the addition is 30 wt % or under, the heat capacity at 4.2K is 0.3 J/cc·K or over.

TABLE 12

Addition of Al$_2$O$_3$

| Sample | Amount of additive/wt % | Heat capacity at the magnetic phase transition temp./ J/cc · K | Heat capacity at 4.2 K/ J/cc · K |
|---|---|---|---|
| Example 1 | Non-dope | 1.2 | 0.50 |
| Embodiment 12 | 0.1 | 1.2 | 0.50 |
| " | 0.5 | 1.1 | 0.50 |
| " | 1 | 1.0 | 0.50 |
| " | 10 | 0.87 | 0.47 |
| " | 20 | 0.64 | 0.37 |
| " | 30 | 0.48 | 0.33 |
| " | 40 | 0.39 | 0.24 |

Embodiment 13 Addition of Mullite

Gd$_2$O$_2$S ceramic containing mullite were prepared with mullite, 3Al$_2$O$_3$–2SiO$_2$ instead of partially stabilized zirconia (3Y—ZrO$_2$). The other conditions were similar to those of embodiment 11. Moreover, Gd$_2$O$_2$S ceramics were prepared with a non-oxide such as Si$_3$N$_4$, Sialon, TiN, AlN, BN, Sic, or TiC instead of partially stabilized zirconia (3Y—ZrO$_2$). The conditions were similar to those of embodiment 11 except no calcination was made before sulfurization. When the additive was changed to mullite, Si$_3$N$_4$, Sialon, TiN, AlN, BN, SiC or TiC, the results were comparable to those of embodiments 11 and 12 when the amount of addition was the same.

Embodiment 14 Addition of CaO

Gd$_2$O$_2$S ceramic with the addition of CaO (Ca-doped Gd$_2$O$_2$S) were prepared with CaO instead of partially stabilized zirconia (3Y—ZrO$_2$). The other conditions were similar to those of embodiment 11. The density of the resulting Ca-doped Gd$_2$O$_2$S was determined to be 99.9% of the theoretical density by Archimedes' method; and the mean grain size was 1.9–2.1 μm. Table 13 shows the heart capacity at the magnetic phase transition temperature (the temperature of the highest peak of heat capacity) corresponding to the amount of CaO addition, and the heat capacity at 4.2. K. As can be seen in Table 13, with the CaO addition, the heat capacity at the magnetic phase transition temperature decreases, but when the addition is 30 wt % or under, the heat capacity at a desired temperature higher than 10 K is 0.3 J/cc·K or over. These samples were ground and polished, and the sample faces were subjected to X-ray diffraction to determine the kinds of phases. The distribution of phases was examined under a metallograph. The presence of a phase differing from the main phase and containing CaO was confirmed. It was evenly dispersed through the main phase. With the increase in the addition of CaO, the ratio of the phase containing CaO increased. This phase is considered to be formed by the deposit of CaO which could not be solid dissolved in the main phase.

TABLE 13

Addition of CaO

| Sample | Amount of additive/wt % | Heat capacity at the magnetic phase transition temp./ J/cc · K | Heat capacity at 4.2 K/ J/cc · K |
|---|---|---|---|
| Example 1 | Non-dope | 1.2 | 0.50 |
| Embodiment 14 | 0.07 | 1.2 | 0.50 |
| " | 0.7 | 1.1 | 0.50 |
| " | 1.4 | 1.0 | 0.49 |
| " | 14 | 0.88 | 0.47 |
| " | 28 | 0.67 | 0.37 |
| " | 42 | 0.47 | 0.27 |

Embodiment 15

$Gd_2O_2S$ ceramics with the addition of MgO (Mg-doped $Gd_2O_2S$) were prepared with MgO instead of CaO. The other conditions were similar to those of embodiment 14. The density of the resulting Mg-doped $Gd_2O_2S$ was determined to be 99.9% of the theoretical density by Archimedes' method, and the mean gain size was 1.9–2.2, μm. Like the Ca-doped $Gd_2O_2S$, the heat capacity at 4.2 K was 0.3 J/cc·K or over when the amount of addition of MgO was 30 wt % or under.

Embodiment 16

SrO or BaO were used instead of CaO, and other conditions of preparation were similar to those of embodiment 14. The results of Sr-doped $Gd_2O_2S$ and Ba-doped $Gd_2O_2S$ were comparable to those of embodiments 14 and 15.

Embodiment 17 Addition of $Cr_2O_3$ $Cr_2O_3$ was used instead of partially stabilized zirconia to prepare $Gd_2O_2S$ ceramics (Cr-doped $Gd_2O_2S$). The other conditions were similar to those of embodiment 11. The density of the resulting Cr-doped $Gd_2O_2S$ was determined to be 99.9% of the theoretical density by Archimedes' method, and the mean grain size was 2.0–2.3 μm. Table 14 shows the heat capacity at the magnetic phase transition temperature (the temperature of the highest peak of heat capacity) corresponding to the amount of addition of $Cr_2O_3$, and the heat capacity at 4.2K. As can be seen in Table 14, with the addition of $Cr_2O_3$, the heat capacity at the magnetic phase transition temperature decreases, but when the addition of $Cr_2O_3$ is 30 wt % or under, the heat capacity at 4.2 K is 0.3 J/cc·K or over. These observations were also true for samples to which any of transition metal oxides other than $Cr_2O_3$ was added. These samples were ground and polished, and the sample faces were subjected to X-ray diffraction and were examined under a metallograph to find the distribution of the main phase and the second phase. It was found that the second phase differing from the main phase containing $Cr_2O_3$ was evenly dispersed through the main phase.

TABLE 14

Addition of $Cr_2O_3$

| Sample | Amount of additive/wt % | Heat capacity at the magnetic phase transition temp./ J/cc · K | Heat capacity at 4.2 K/ J/cc · K |
|---|---|---|---|
| Example 1 | Non-dope | 1.2 | 0.50 |
| Embodiment 17 | 0.07 | 1.2 | 0.50 |
| " | 0.7 | 1.1 | 0.50 |
| " | 1.4 | 1.0 | 0.49 |
| " | 14 | 0.85 | 0.46 |
| " | 28 | 0.68 | 0.38 |
| " | 42 | 0.46 | 0.28 |

Embodiment 18

$Gd_2O_2S$ ceramics containing MnO (Mn-doped $Gd_2O_2S$) were prepared with MnO instead of $Cr_2O_3$. The other conditions were similar to those of embodiment 17. The density of the resulting Mn-doped $Gd_2O_2S$ was determined to be 99.9% of the theoretical density by Archimedes' method, and the mean grain size was 2.0–2.3 μm. Like Cr-doped $Gd_2O_2S$, when the addition of MnO was 30 wt % or under, the heat capacity at 4.2 K was 0.3 J/cc·K or over.

Embodiment 19

A $Gd_2O_2S$ ceramics regenerative material was prepared by using a transition metal oxide other than $Cr_2O_3$ and MnO as the additive. Other conditions were similar to those of embodiment 17. The results of this regenerative material were comparable to those of embodiments 17 and 18.

Embodiment 20 Zirconia Addition to Gd—Tb Composite Oxysulfides

Partially stabilized zirconia ($3Y—ZrO_2$) was added to a mixture of terbium oxide of which mean particle size was 0.69 μm and the gadolinium oxide used in embodiment 11. They were subjected to sulfurization, forming, hydrostatic pressing and sintering in a manner similar to that of example 1 to prepare gadolinium-terbium oxysulfide ceramics containing partially stabilized zirconia ($3Y—ZrO_2$) (Zr-doped $Gd_xTb_{2-x}O_2S$). FIG. 8 shows the heat capacities of $GdxTb_{2-x}O_2S$. Tables 15 through 17 show the amount of addition of $ZrO_2$ and the heat capacity at the desired temperature for various values of x. Examples 2 through 7 are $Gd_xTb_{2-x}O_2S$ ceramics with no addition of $ZrO_2$. From tables 15 through 17, it can be seen that a heat capacity of 0.3 J/cc·K or over is secured for a relatively wide range of temperatures of 10 K or under. For x≧1, Zr-doped $Gd_xTb_{2-x}O_2S$ can be used as a regenerative material for the neighborhood of 4.2 K. For x<0.1, it can be used as a regenerative material for the neighborhood of 6 K–7 K. Even when $ZrO_2$ is added up to 30 wt %, the heat capacity at any desired temperatures of 10 K or under never fall below 0.3 J/cc·K. Similar results were obtained when Gd or Tb was substituted with another rare earth element such as Dy or Ho.

TABLE 15

Addition of $ZrO_2$

| Sample | Amount of additive/ wt % | Value of x | Heat capacity at 4.2 K/J/cc · K |
|---|---|---|---|
| Example 2 | Non-dope | 1.8 | 0.55 |
| Embodiment 20 | 0.1 | 1.8 | 0.55 |
| " | 0.5 | 1.8 | 0.55 |
| " | 1 | 1.8 | 0.55 |
| " | 10 | 1.8 | 0.51 |
| " | 20 | 1.8 | 0.41 |
| " | 30 | 1.8 | 0.36 |
| " | 40 | 1.8 | 0.26 |
| Example 3 | Non-dope | 1 | 0.59 |
| Embodiment 20 | 0.1 | 1 | 0.59 |
| " | 0.5 | 1 | 0.59 |
| " | 1 | 1 | 0.59 |
| " | 10 | 1 | 0.55 |
| " | 20 | 1 | 0.43 |
| " | 30 | 1 | 0.39 |
| " | 40 | 1 | 0.28 |

TABLE 16

Addition of $ZrO_2$

| Sample | Amount of additive/ wt % | Value of x | Heat capacity at 5.0 K/J/cc · K |
|---|---|---|---|
| Example 4 | Non-dope | 0.2 | 0.71 |
| Embodiment 20 | 0.1 | 0.2 | 0.71 |
| " | 0.5 | 0.2 | 0.71 |
| " | 1 | 0.2 | 0.71 |
| " | 10 | 0.2 | 0.68 |
| " | 20 | 0.2 | 0.5 |
| " | 30 | 0.2 | 0.41 |
| " | 40 | 0.2 | 0.29 |

TABLE 17

Addition of $ZrO_2$

| Sample | Amount of additive/ wt % | Value of x | Heat capacity at 6.0 K/J/cc · K |
|---|---|---|---|
| Example 5 | Non-dope | 0.1 | 1 |
| Embodiment 20 | 0.1 | 0.1 | 1 |
| " | 0.5 | 0.1 | 1 |
| " | 1 | 0.1 | 0.93 |
| " | 10 | 0.1 | 0.84 |
| " | 20 | 0.1 | 0.64 |
| " | 30 | 0.1 | 0.56 |
| " | 40 | 0.1 | 0.28 |
| Example 6 | Non-dope | 0.05 | 1.2 |
| Embodiment 20 | 0.1 | 0.05 | 1.2 |
| " | 0.5 | 0.05 | 1.2 |
| " | 1 | 0.05 | 1.1 |
| " | 10 | 0.05 | 0.92 |
| " | 20 | 0.05 | 0.73 |
| " | 30 | 0.05 | 0.51 |
| " | 40 | 0.05 | 0.29 |

TABLE 17-continued

Addition of $ZrO_2$

| Sample | Amount of additive/ wt % | Value of x | Heat capacity at 6.0 K/J/cc · K |
|---|---|---|---|
| Example 7 | Non-dope | 0 | 0.88 |
| Embodiment 20 | 0.1 | 0 | 0.88 |
| " | 0.5 | 0 | 0.88 |
| " | 1 | 0 | 0.88 |
| " | 10 | 0 | 0.72 |
| " | 20 | 0 | 0.51 |
| " | 30 | 0 | 0.42 |
| " | 40 | 0 | 0.28 |

Embodiment 21

Regenerative material ceramics were prepared with $Al_2O_3$, mullite, non-oxides such as $Si_3N_4$, Sialon, TiN, AlN, BN, or TiC instead of partially stabilized zirconia (3Y—$ZrO_2$). Other conditions were similar to those of embodiment 20. The results obtained from $Gd_xTb_{2-x}O_2S$ ceramics with different kinds of additives were comparable to those of embodiment 20.

Embodiment 22

Gadolinium-terbium oxysulfide ceramics (Ca-doped $Gd_xTb_{2-x}O_2S$) were prepared with any of alkaline earth metal oxides (MgO, CaO, SrO, BaO) by substituting partially stabilized zirconia (3Y—$ZrO_2$). Other conditions were similar to those of embodiment 20. The heat capacity characteristics of the ceramics showed tendencies similar to those of Zr-doped $Gd_xTb_{2-x}O_2S$ when the alkaline earth metal oxide was 30 wt % or under.

Embodiment 23

Gadolinium-terbium oxysulfide ceramics (Ca-doped $Gd_xTb_{2-x}O_2S$) regenerative materials were prepared with any of transition metal oxides (oxides of elements of which atomic numbers are 22 (Ti) to 31 (Ga) and 72 (Hf)) by substituting partially stabilized zirconia Other conditions were similar to those of embodiment 20. The results obtained from these materials were similar to those of Zr-doped $Gd_xTb_{2-x}O_2S$ when the transition metal oxide was 30 wt % or under.

Embodiment 24 Durability Under Continuous Operation

The Zr-doped $Gd_2O_2S$ powders (after sulfurization and before sintering) of embodiment 11 were spherically formed by the tumbling pelletizing, and the obtained granules were sieved with two kinds of filter nets (mesh A (opening: 597 μm) and mesh B (opening: 435 μm)). The sieved granules were made to roll over a mirror-finished iron plate tilted at about 25°. The granules which rolled down were recovered to make shape classification. The mean particle size of 100 granules was 0.5 mm. The mean particle size of the Zr-doped $Gd_2O_2S$ granules was measured on an image taken with a video high scope system.

The obtained Zr-doped $Gd_2O_2S$ granules were filled in a crucible of alumina, and the granules were subjected to atmospheric sintering in argon atmosphere in the manner described above. The sintering temperature was 1500° C. and the sintering time was 6 hours. Thus Zr-doped $Gd_2O_2S$ regenerative materials of which mean particle size was 0.4 mm and mean aspect ratio was 1.1 were obtained. The mean particle size and the mean aspect ratio of the Zr-doped $Gd_2O_2S$ regenerative materials were measured on a video high scope image. The density of the $Gd_2O_2S$ regenerative materials measured by the pycnometer, was 99.9% of the theoretical density, and the mean grain size was 1.1–1.5 μm.

In a way similar to that of embodiment 6, Zr-doped $Gd_2O_2S$ regenerative materials were surface-treated by rotary barrel finishing. The obtained Zr-doped $Gd_2O_2S$ regenerative materials were packed in a regenerator of a GM refrigerator, and the state of breakage of granules after 1500 hours, 2500 hours and 10000 hours of continuous operation in a way similar to that of embodiment 6. The results are shown in Table 18. Example 8 are $Gd_2O_2S$ ceramics granules to which no $ZrO_2$ was added. When $ZrO_2$ added by 0.05 wt % or over, no problem occurred even after 10,000 hours. When the addition was 0.01 wt %, no significant differences were observed in the durability. This was attributed to lack of the strengthening phase ($ZrO_2$ phase). Similar tendencies were also observed when Gd was substituted with another rare earth element such as Dy or Ho.

TABLE 18

Addition of $ZrO_2$

| Sample | Amount of additives/ wt % | After 1500 hrs operation | After 10000 hrs operation |
|---|---|---|---|
| Example 8 | Non-dope | ca. 5% of granules failed. | — |
| Embodiment 24 | 0.01 | ca. 5% of granules failed. | — |
| " | 0.05 | No problem | No problem |
| " | 0.5 | No problem | No problem |
| " | 1 | No problem | No problem |
| " | 10 | No problem | No problem |
| " | 20 | No problem | No problem |
| " | 30 | No problem | No problem |
| " | 40 | No problem | No problem |

Embodiment 25

The $Gd_2O_2S$ powders (after sulfurization and before sintering) obtained in embodiment 12 ($Al_2O_3$) and embodiment 13 (mullite) were used, with other conditions being similar to those of embodiment 24. The granules were subjected continuously to GM refrigeration operation cycle, and the state of breakage of granules was observed after 1500 hours, 2500 hours and 10000 hours. Like the Zr-doped $Gd_2O_2S$ ceramics granules, the ceramic granules with addition of the additive by 0.05 wt % or over showed no problem even after 10000 hours of continuous operation of the GM refrigerator. The ceramic granules with addition of the additive by less than 0.05 wt %, however, had finely broken granules after 1500 hours of continuous operation.

Embodiment 26

The $Gd_2O_2S$ powders (to which alkaline earth oxides were added) described in embodiments 14 through 16 were used, with other condition being identical to those of embodiment 24. The granules were subjected continuously to GM refrigeration operation cycle, and the state of breakage of granules was observed after 1500 hours, 2500 hours and 10000 hours. The results of addition of CaO are shown in Table 19. The ceramic granules to which CaO was added by 0.05 wt % or over had finely broken granules after 10000 hours of continuous operation. On the other hand, granules to which CaO was added by less than 0.05 wt % had finely broken granules after 1500 hours of continuous operation Similar tendencies were observed when CaO was substituted with another alkaline earth metal oxide such as MgO, SrO or BaO, or when Gd was substituted with another rare earth element such as Dy or Ho.

TABLE 19

Addition of CaO

| Sample | Amount of additives/ wt % | After 1500 hrs operation | After 2500 hrs operation | After 10000 hrs operation |
|---|---|---|---|---|
| Example 8 | Non-dope | ca. 5% failed. | — | |
| Embodiment 26 | 0.01 | ca. 5% failed. | — | |
| " | 0.07 | No problem | No problem | ca. 20% failed. |
| " | 0.7 | No problem | No problem | ca. 15% failed. |
| " | 1.4 | No problem | No problem | ca. 15% failed. |
| " | 14 | No problem | No problem | ca. 10% failed. |
| " | 28 | No problem | No problem | ca. 10% failed. |
| " | 42 | No problem | No problem | ca. 10% failed. |

Embodiment 27 Addition of Transition Metal Oxides

The $Gd_2O_2S$ powders to which transition metal oxides were added in embodiments 17 through 19 were used, with other condition being identical to those of embodiment 24. The granules were subjected continuously to GM refrigeration operation cycle, and the state of breakage of granules was observed after 1500 hours, 2500 hours and 10000 hours. The results were similar to those of granules to which alkaline earth metal oxides were added. The ceramics regenerative materials to which the transition metal oxide was added by 0.05 wt % or over endured 2500 hours of continuous operation, but they could not endure 10000 hours of continuous operation. The ceramics regenerative materials to which the transition metal oxide was added by less than 0.05 wt % had finely broken granules after 1500 hours of continuous operation. Similar tendencies were observed when Gd was substituted with another rare earth element such as Dy or Ho.

Embodiment 28 Durability of Gd—Tb Composite Oxysulfides

Like the samples described in embodiment 20, the value of x was varied, with other conditions being similar to those of embodiment 24, to prepare ceramics granules to which $ZrO_2$ was added. The state of breakage of granules in relation to differences in the value of x of $Gd_xTb_{2-x}O_2S$ was evaluated with the GM refrigeration operation cycle test used in embodiment 24. The results are shown in Table 20. Examples 9 through 12 are $Gd_xTb_{2-x}O_2S$ ceramics granules to which no $ZrO_2$ was added. Even when the value of x of $Gd_xTb_{2-x}O_2S$ was varied, the ceramics granules to which $ZrO_2$ was added by 0.05 wt % or over posed no problem even after 10000 hours of continuous operation of the GM refrigerator. On the other hand, the ceramics granules to which $ZrO_2$ was added by less than 0.05 wt % had finely broken granules after 1500 hours of continuous operation.

TABLE 20

Addition of $ZrO_2$

| Sample | Amount of additive/ wt % | Value f x | After 1500 hrs operation | After 10000 hrs of operation |
|---|---|---|---|---|
| Example 9 | Non-dope | 1.8 | ca. 5% failed | — |
| Embodiment 28 | 0.01 | 1.8 | ca. 5% failed | — |
| " | 0.05 | 1.8 | No problem | No problem |
| " | 0.1 | 1.8 | No problem | No problem |
| " | 1 | 1.8 | No problem | No problem |
| " | 10 | 1.8 | No problem | No problem |
| " | 30 | 1.8 | No problem | No problem |
| Example 10 | Non-dope | 1 | ca. 5% failed | — |
| Embodiment 28 | 0.05 | 1 | No problem | No problem |
| " | 0.1 | 1 | No problem | No problem |
| " | 1 | 1 | No problem | No problem |
| " | 10 | 1 | No problem | No problem |
| " | 30 | 1 | No problem | No problem |
| Example 11 | Non-dope | 0.2 | ca. 5% failed | — |
| Embodiment 28 | 0.05 | 0.2 | No problem | No problem |
| " | 0.1 | 0.2 | No problem | No problem |
| " | 1 | 0.2 | No problem | No problem |
| " | 10 | 0.2 | No problem | No problem |
| " | 30 | 0.2 | No problem | No problem |
| Example 12 | Non-dope | 0 | ca. 5% failed | — |
| Embodiment 28 | 0.05 | 0 | No problem | No problem |
| " | 0.1 | 0 | No problem | No problem |
| " | 1 | 0 | No problem | No problem |
| " | 10 | 0 | No problem | No problem |
| " | 30 | 0 | No problem | No problem |

Conclusions Concerning Additives

As described above, what excel most in the durability under continuous operation of refrigerators and the heat capacity are ceramics granules to which any of $Al_2O_3$, $ZrO_2$, mullite, $Si_3N_4$, Sialon, TiN, AlN, BN, SiC and Tic was added by 0.05–30 wt % in total followed by ceramics granules to which any of alkaline earth metals (oxides of Mg, Ca, Sr and Ba) and transition metal oxides (oxides of elements of which atomic numbers are from 22 (Ti) through 31 (Ga) and 72 (Hf)) was added by 0.05 wt % –30 wt %.

Refrigerating Capacities

The refrigeration characteristics of the regenerative materials, the Zr-doped $Gd_2O_2S$ to which $ZrO_2$ was added by 10 wt % (embodiment 24), the Al-doped $Gd_2O_2S$ to which $Al_2O_3$ was added by 10 wt % (embodiment 25), and the Zr-doped $Gd_{1.8}Tb_{0.2}O_2S$ to which $ZrO_2$ was added by 10 wt % (embodiment 28), the $Gd_2O_2S$ to which no additive was added (example 8), and the $Gd_{1.8}Tb_{0.2}O_2S$ to which no additive was added (example 9) were examined with a two-stage type GM refrigerator of which power consumption was 3.4 kW. In the conventional refrigerator wherein Pb was used for the regenerator of the first stage on the higher temperature side and $HoCu_2$ was used in the regenerator of the second stage, the refrigerating capacity at 4.2 K was 1.31 kW, and the lowest attained temperature with no application was 2.79 K.

50 wt % of the lower temperature side of $HoCu_2$ in the second stage was substituted with the regenerative materials such as $Gd_2O_2S$ of example 8, the Zr-doped $Gd_2O_2S$ to which $ZrO_2$ was added by 10 wt % (embodiment 24), the Al-doped $Gd_2O_2S$ to which $Al_2O_3$ was added by 10 wt % (embodiment 25), or the Zr-doped $Gd_{1.8}Tb_{0.2}O_2S$ to which $ZrO_2$ was added by 10 wt % (embodiment 28). Then, their refrigerating capacities were measured The results are shown in Table 21. The regenerative materials of these embodiments exhibited refrigerating capacities and lowest achieved temperatures which were substantially comparable with those of the rare earth metal oxysulfide regenerative materials to which no additive was added.

TABLE 21

Refrigerating Capacities

| Sample | Sample condition | Refrigerating capacity (4.2 K)/W | Lowest achieved temperature/K |
|---|---|---|---|
| Prior art | $HoCu_2$ | 1.31 | 2.79 |
| Example 8 | $Gd_2O_2S$ | 1.69 | 2.62 |
| Example 9 | $Gd_{1.8}Tb_{0.2}O_2S$ | 1.73 | 2.61 |
| Embodiment 24 | $ZrO_2$-10 wt % $Gd_2O_2S$ | 1.68 | 2.62 |
| Embodiment 25 | $Al_2O_3$-10 wt % $Gd_2O_2S$ | 1.68 | 2.63 |
| Embodiment 28 | $ZrO_2$-10 wt % $Gd_{1.8}Tb_{0.2}O_2S$ | 1.73 | 2.62 |

CONCLUSIONS CONCERNING ADDITIVES

As described above, what excel most in the durability under continuous operation of refrigerators and the heat capacity are ceramics granules to which any of $Al_2O_3$, $ZrO_2$, mullite, $Si_3N_4$, Sialon, TiN, AlN, BN, SiC and TiC was added by 0.05–30 wt % in total, followed by ceramics granules to which any of alkaline earth metals (oxides of Mg, Ca, Sr and Ba) and transition metal oxides (oxides of elements of which atomic numbers are from 22 (Ti) through 31 (Ga) and 72 (Hf)) was added by 0.05–30 wt %.

The description of the embodiments were centered mainly on $Gd_xTb_{2-x}O_2S$. Other rare earth metal oxysulfide regenerative materials to which $Al_2O_3$, $ZrO_2$, mullite, $Si_3N_4$, Sialon, TiN, AlN, BN, SiC, or TiC was added by 0.05–0.3 wt % posed no problem even after 10,000 hours of continuous operation of the GM refrigerator. When any of alkaline earth metal oxides (oxides of Mg, Ca, Sr and Ba) and transition metal oxides (oxides of elements of which atomic numbers are 22 (Ti) through 31 (Ga) and 72 (Hf)) was added by 0.05–30 wt %, the embodiments posed no problem after 2500 hours of continuous operation of the GM refrigerator.

The invention claimed is:

1. A rare earth metal oxysulfide regenerative material comprising a rare earth metal oxysulfide represented by a general formula $R_2O_2S$ in which R represents at least one member of rare earth elements selected from the group consisting of La, Ce, Pr, Nd, Sm, Eu, Gd, Tb, Dy, Ho, Er, Tm, Yb, Lu and Y, characterized in that an additive comprising an oxide, a carbide or a nitride of at least one member selected from the group consisting of alkaline-earth metals, transition metals, and elements of 3b and 4b groups of the periodic table excluding C is added to said rare earth metal oxysulfide by 0.05–30 wt %.

2. A rare earth metal oxysulfide regenerative material of claim 1, characterized in that said rare earth metal oxysulfide is $Tb_2O_2S$.

3. A rare earth metal oxysulfide regenerative material of claim 1, characterized in that said additive is at least one compound selected from the group consisting of $Al_2O_3$, $ZrO_2$, mullite, $Si_3N_4$, Sialon, TiN, AlN, BN, SiC, and TiC.

4. A rare earth metal oxysulfide regenerative material of claim 3, characterized in that said additive is at least one compound selected from the group consisting of $ZrO_2$, $Si_3N_4$, Sialon, TiN, AlN, BN, SiC, and TiC.

5. A rare earth metal oxysulfide regenerative material of claim 1, characterized in that said additive is an oxide of at least one alkaline earth metal element selected from the group consisting of Mg, Ca, Sr, and Ba.

6. A rare earth metal oxysulfide regenerative material of claim 1, characterized in that said additive is an oxide of at least one transition metal element selected from the group consisting of elements of which atomic numbers are 22 (Ti)–31 (Ga) and 72 (Hf).

7. A rare earth metal oxysulfide regenerative material of claim 1, characterized in that the rare earth metal oxysulfide regenerative material has a $R_2O_2S$ phase as a main phase and a second phase including said additive in a ceramics microstructure, and the second phase is different from said main phase.

8. A regenerator packed with a rare earth metal oxysulfide regenerative material comprising a rare earth metal oxysulfide represented by a general formula $R_2O_2S$ (R denotes at least one member of rare earth elements selected from the group consisting of La, Ce, Pr, Nd, Sm, Eu, Gd, Tb, DY, Ho, Er, Tm, Yb and Lu, as well as Y).

9. A regenerator of claim 8, characterized in the $HoCu_2$ as a regenerative material working at a relatively higher temperature and the rare earth metal oxysulfide regenerative material as a material working at a relatively lower temperature are packed in layers.

10. A regenerator of claim 8, characterized in that a Tb oxysulfide regenerative material is packed in a layer for working at relatively higher temperature and a Gd oxysulfide regenerative material is packed in another layer for working at relatively lower temperature.

11. A regenerator of claim 10, characterized in that a Ho or Dy oxysulfide regenerative material is packed in a further layer on a lower temperature side of the Gd oxysulfide regenerative material layer.

12. A regenerator of claim 8, characterized in that an additive comprising a compound of an oxide, a carbide or a nitride of alkaline-earth metals, transition metals, or elements of 3b and 4b groups of the periodic table excluding C is added to said rare earth metal oxysulfide by 0.05–30 wt %.

13. A regenerator of claim 12, characterized in that said additive is at least one compound selected from the group consisting of $ZrO_2$, $Si_3N_4$, Sialon, TiN, AlN, BN, SiC, and Tic.

14. A regenerator of claim 8, characterized in that said rare earth metal oxysulfide regenerative material is $Gd_{2-x}Tb_xO_2S$ (x=0–2).

15. A regenerator of claim 14, characterized in that the value of x in said rare earth metal oxysulfide $Gd_{2-x}Tb_xO_2S$ is 0.2–2.

* * * * *